United States Patent
Ando et al.

(10) Patent No.: US 7,385,801 B2
(45) Date of Patent: Jun. 10, 2008

(54) ORGANIC ELECTROLYTE CAPACITOR

(75) Inventors: Nobuo Ando, Tokyo (JP); Kenji Kojima, Tokyo (JP); Shinichi Tasaki, Tokyo (JP); Hiromoto Taguchi, Tokyo (JP); Tsutomu Fuji, Tokyo (JP); Yukinori Hato, Tokyo (JP); Chisato Marumo, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 122 days.

(21) Appl. No.: 10/551,875

(22) PCT Filed: Mar. 29, 2004

(86) PCT No.: PCT/JP2004/004469

§ 371 (c)(1),
(2), (4) Date: Sep. 30, 2005

(87) PCT Pub. No.: WO2004/097867

PCT Pub. Date: Nov. 11, 2004

(65) Prior Publication Data

US 2007/0002523 A1    Jan. 4, 2007

(30) Foreign Application Priority Data

Mar. 31, 2003    (JP) .............................. 2003-96664

(51) Int. Cl.
*H01G 9/00*    (2006.01)
*H01G 9/02*    (2006.01)
*H01G 9/04*    (2006.01)

(52) U.S. Cl. ...................... 361/503; 361/512; 361/508

(58) Field of Classification Search ................ 361/502, 361/503, 508, 512; 252/62.2
See application file for complete search history.

(56) References Cited

U.S. PATENT DOCUMENTS

| 5,949,637 | A | * | 9/1999 | Iwaida et al. ............... 361/502 |
| 6,096,455 | A | * | 8/2000 | Satake et al. ............... 429/241 |
| 6,097,587 | A | * | 8/2000 | Inagawa et al. ............ 361/502 |
| 6,862,168 | B2 |  | 3/2005 | Ando et al. |

FOREIGN PATENT DOCUMENTS

| JP | 8-107048 A | 4/1996 |
| JP | 11-162787 A | 6/1999 |
| JP | 11-283871 A | 10/1999 |
| JP | 2001-85065 A | 3/2001 |
| JP | 3485935 B2 | 1/2004 |
| WO | WO-98/33227 A1 | 7/1998 |
| WO | WO-00/11688 A1 | 3/2000 |

* cited by examiner

*Primary Examiner*—Eric Thomas
(74) *Attorney, Agent, or Firm*—Darby & Darby P.C.

(57) ABSTRACT

There is provided an organic electrolyte capacitor having electrodes on current collectors that have holes penetrating the front and rear surfaces, in which electrode materials formed on the through-holes of the current collectors seldom fall off and high energy density and high power density can be obtained. The organic electrolyte capacitor includes positive electrodes, negative electrodes and an electrolyte capable of transferring lithium ions, in which the positive electrodes contain a substance capable of carrying lithium ions and/or anions reversibly as a positive electrode active material, the negative electrodes contain a substance capable of carrying lithium ions as a negative electrode active material, the positive and negative electrodes possess the positive or negative electrode active material layers on an electrode substrate that has conductive layers made of conductive materials on current collectors, which have through-holes, and the negative electrodes carry lithium electrochemically.

16 Claims, 18 Drawing Sheets

ORGANIC ELECTROLYTE CAPACITOR

This is a U.S. National Phase Application under 35 U.S.C. §371 of International Patent Application No. PCT/JP2004/004469, filed Mar. 29, 2004, and claims benefit of Japanese Patent Application No. 2003/96664, filed Mar. 31, 2003 both of which are incorporated by reference herein. The International Application was published in Japanese on Nov. 11, 2004 as WO 2004/097867 A3 under PCT Article 21(2).

CLEAN SPECIFICATION

Description

1. Technical Field

The present invention relates to an organic electrolyte capacitor having high energy density and high output density and a current collector using the same, and particularly, to an organic electrolyte capacitor having high energy density and high output density, in which conductive layers are made of conductive materials on the current collectors having through holes that penetrate the front and rear surfaces, electrodes are formed with positive or negative electrode active material layers formed on the conductive layers, and lithium ions move.

2. Background Art

In recent years, a secondary battery, which uses conductive polymers, transition metal oxide and the like for a positive electrode, and uses lithium metal or lithium alloys for a negative electrode, has been proposed as a battery replacing Ni—Cd battery and a lead battery due to high energy density thereof. However, the above secondary battery has a practical problem in that, if the battery is charged or discharged repeatedly, the positive or negative electrode deteriorates, and thus the capacity decreases. Particularly, there is a safety problem in that the deterioration of the negative electrode is accompanied by generation of needle-like lithium crystals, so called dendrite. The dendrite breaks through a separator as the battery is charged and discharged repeatedly, which causes short-circuit in the battery, and the battery may explode at the end, leading to severe safety problem.

In order to solve the above problems, a battery that uses a carbon material such as graphite and the like for the negative electrode and uses a lithium-contained metal oxide such as $LiCoO_2$ and the like for the positive electrode has been proposed. The battery is called a rocking-chair battery, in which lithium ions are supplied to the negative electrode from the lithium-contained metal oxide of the positive electrode by charging after the assembly of the battery, and lithium in the negative electrode returns to the positive electrode by discharging. The battery does not use metal lithium ions in the negative electrode, and only lithium take part in charging and discharging. Therefore, the battery is called a lithium ion secondary batter, and distinguished from a lithium battery using metal lithium. The battery is characterized by high voltage and high capacity.

As environment problems are getting more attention, a storage system of clean energy generated by solar or wind power generation, a dispersed electric power supply for load-leveling of electric power, and a power supply (main and auxiliary power supplies) for an electric vehicle or a hybrid electric vehicle, which will replace a gasoline vehicle, are under active development. In addition, although a lead battery has been used as a power supply for on-vehicle electronic devices so far, a new power supply having high energy density and high output density is demanded as power windows or IT-related devices are mounted in vehicles in recent years.

The lithium ion secondary battery or an electric double-layer capacitor is getting more attention as a new storage device or power supply for driving. However, though the lithium ion battery has high energy density, there is something to be solved in output characteristic, safety or cycle life. On the other hand, the electric double-layer capacitor, which is a widely used electronic part for memory backup power supply of IC or LSI, has high output characteristic and is free from maintenance requirement, which a lithium ion battery or nickel-hydrogen battery does not have. Furthermore, the electric double-layer capacitor shows excellent instantaneous charging/discharging characteristic, and can be used for several tens of thousands or more charging/discharging cycles, even though the electric double-layer capacitor has a smaller discharging capacity per one charge than that of the battery. Despite the above advantages, the electric double-layer capacitor has the energy density of about 3 to 4 Wh/1, which is smaller than that of the lithium ion battery. Therefore the electric double-layer capacitor cannot be practically used as driving power supplies for electric vehicles demanding high energy density. It is told that the energy density of a storage device should be in the range of 6 to 10 Wh/1 for using on electric vehicles practically and 20 Wh/1 for popularizing electric vehicles.

As a storage device suitable for uses demanding high energy density and high output characteristic, in which lithium ions move, Japanese Patent Application No. 10-531811 proposes an organic electrolyte battery, in which both positive and negative current collectors have holes penetrating front and rear surfaces respectively, a negative electrode active material can carry lithium ions reversibly, and lithium ions from negative electrodes are carried by electrochemical contact with lithium metal arranged to face the negative or positive electrode.

In the above invention, since the current collector has that the holes penetrating the front and rear surfaces thereof are provided, so that lithium ions can pass through between the front and rear surfaces of the electrodes without being blocked by the current collectors, lithium ions can be carried electrochemically not only to the negative electrodes arranged in the vicinity of the lithium metal but also to the negative electrodes arranged away from the lithium metal through the through-holes, even in the laminated cell structure of a storage device, in which many electrodes are laminated. In addition, since lithium ions can move freely between electrodes through the through-holes, the organic electrolyte battery can be charged and discharged smoothly.

In the above method, an electrode is formed on an electrode current collector by coating a mixture of a binder resin and electrode active material that can carry lithium ions reversibly. However, a current collector having holes that penetrate the front and rear surfaces, for example, such as an expanded metal, has lower tensile strength than a metal foil having with the same thickness but no holes, therefore a thick current collector is required in an actual coating with an electrode active material, and this it is difficult to improve the energy and power density by making the electrode thin. Also, when the current collector is coated with the electrode active material on condition that holes of current collector are open, the electrode material passes through the through-holes, thereby being difficult to uniformly coat for the current collectors. Furthermore, electrodes materials applied at the through-holes or edge portions (end portion) of the current collector are likely to drop out, and it is difficult to manufactured a uniform electrode, whereby a short circuit can be induced in the battery, and the reliability and durability of the storage device can deteriorate.

It is an object of the invention to provide an organic electrolyte capacitor, which can be produced industrially, has high energy density, and power density and shows low resistance toward the movement of lithium ions, by using electrodes that have high conductivity, high strength, and high uniformity.

DISCLOSURE OF THE INVENTION

As a result of intensive examination to solve the above problems, the present inventors found out that it is possible to improve conductivity of electrodes and to obtain a high performance organic electrolyte capacitor having low internal resistance and high power density, in which lithium ion can move easily, by forming conductive layers with conductive materials on current collectors, which have through-holes, as an electrode current collector, and using the electrodes that are positive and negative electrode active material layers formed on the electrode current collectors having through-holes, preferably, after at least part of the through-holes of the electrode current collectors which have been blocked previously, and then completed the invention.

That is, the inventions are as follows.

[1] A organic electrolyte capacitor including a positive electrode, a negative electrode and an electrolyte capable of transferring lithium ions, wherein the positive electrode contains a substance capable of carrying lithium ions and/or anions reversibly, as a positive electrode active material, the negative electrode contains a substance capable of carrying lithium ions reversibly, as a negative electrode active material, and wherein electrodes have the positive or negative electrode active material layer on a electrode substrate that has a conductive layer made of a conductive material on an electrode current collector, which has a through-hole that penetrates the front and rear surfaces, and the negative electrode electrochemically carries lithium ions.

[2] The organic electrolyte capacitor according to [1].

wherein the electrode substrate is a three-layer laminate including a first conductive layer that is made of a conductive material and has many through-holes on a surface of an imperforate metal foil and a second conductive layer that is made of a conductive material and has holes or no holes on the other surface of the imperforate metal foil, and has through-holes in the imperforate metal foil, which are formed by etching the laminate.

[3] The organic-electrolyte capacitor according to [1], wherein over 80% of the through-holes of the electrode current collectors are blocked with the conductive materials.

[4] The organic electrolyte capacitor according to [1].

wherein the electrode current collectors are made of either copper or aluminum as a main component.

[5] The organic electrolyte capacitor according to [1], wherein the conductive layer is made of a conductive material containing a conducting agent and a non-aqueous binder, the positive electrode active material layer contains the positive electrode active material and an aqueous binder, and the negative electrode active material layer contains the negative electrode active material and an aqueous binder.

[6] The organic electrolyte capacitor according to [1].

wherein the electrolyte is an aprotic organic solvent solution of a lithium salt.

[7] The organic electrolyte capacitor according to [1], wherein a capacitance per unit weight of the negative electrode active material is more than three times of the capacitance per unit weight of the positive electrode active material, and a weight of the positive electrode active material is larger than the weight of the negative electrode active material.

[8] The organic electrolyte capacitor according to [1], wherein the organic electrolyte capacitor is formed by winding an electrode pair having the positive and negative electrodes.

[9] The organic electrolyte capacitor according to [1], wherein the organic electrolyte capacitor is formed by laminating an electrode pair having the positive and negative electrodes.

[10] The organic electrolyte capacitor according to [1], wherein the negative electrode active material is a thermally treated aromatic condensation polymer and an insoluble and infusible base having a polyacene skeletal structure in which hydrogen/carbon atomic ratio is in the range of 0.50 to 0.05.

[11] The organic electrolyte capacitor according to [1], wherein the positive electrode active material is a mesoporous carbon.

[12] The organic electrolyte capacitor according to [1], wherein the electrode current collectors have thickness of 10 to 39 µm and porosity of 10 to 90%.

[13] The organic electrolyte capacitor according to [1], wherein thickness of the conductive layer on one surface of the positive electrode is in the range of 1 to 20 µm, the thickness of the positive electrode active material layer on one surface of the positive electrode is in the range of 50 to 175 µm, the total thickness of the positive electrode is in the range of 110 to 360 µm, the thickness of the conductive layer on one surface of the negative electrode is in the range of 1 to 20 µm, the thickness of the negative electrode active material layer on one surface of the negative electrode is in the range of 5 to 100 µm, and the total thickness of the negative electrode is in the range of 40 to 210 µm.

[14] An electric device having the organic electrolyte capacitor according to [1].

[15] An electrode substrate that is coated with an electrode material containing an electrode active material and a binder to form electrodes, includes a conductive layer made of a conductive material that is formed on at least one surface of a electrode current collector having through-holes that penetrate front and rear surfaces.

[15'] An electrode substrate that is coated with an electrode material containing an electrode active material and a binder to form electrodes, wherein at least part of through-holes of an electrode current collector having through-holes that penetrate front and rear surfaces are blocked with a conductive material.

[15"] An electrode substrate that is coated with an electrode material containing an electrode active material and a binder to form electrodes, wherein at least one surface of an electrode current collector having through-holes is coated with a conductive material.

[16] An electrical storage device including a positive electrode, a negative electrode, and an electrolyte capable of transferring lithium ions, wherein the positive electrode contains a substance as a positive electrode active material capable of carrying lithium ions and/or anions reversibly, wherein the negative electrode contains a substance as a negative electrode active metal capable of carrying lithium ions reversibly, and wherein the positive and negative electrodes have conductive layers made of conductive materials on electrode current collectors having through-holes, and have a positive or negative electrode active material layer on the conductive layers

[16'] An electrical storage device including positive electrodes, negative electrodes, and an electrolyte capable of transferring lithium ions, wherein the positive electrodes contain substance as a positive electrode active-material capable of carrying lithium ion and/or anion reversibly, the negative electrodes contain substance as a negative electrode active material capable of carrying lithium ions reversibly, and the positive and negative electrodes have positive and negative electrode active material layers on through-holes of electrode current collectors, at least part of which are blocked with conductive materials previously.

[16"] An electrical storage device including positive electrodes, negative electrodes, and an electrolyte capable of transferring lithium ions, wherein the positive electrodes contain substance as a positive electrode active material capable of carrying lithium ions and/or anions reversibly, the negative electrodes contain substances as a negative electrode active material capable of carrying lithium ions reversibly, the positive and negative electrodes have positive and negative electrode active material layers on an electrode current collector having through-holes that penetrate the front and rear surfaces, at least one of the surfaces of which is coated with a conductive material previously.

REFERENCE NUMERALS

Figure 1:
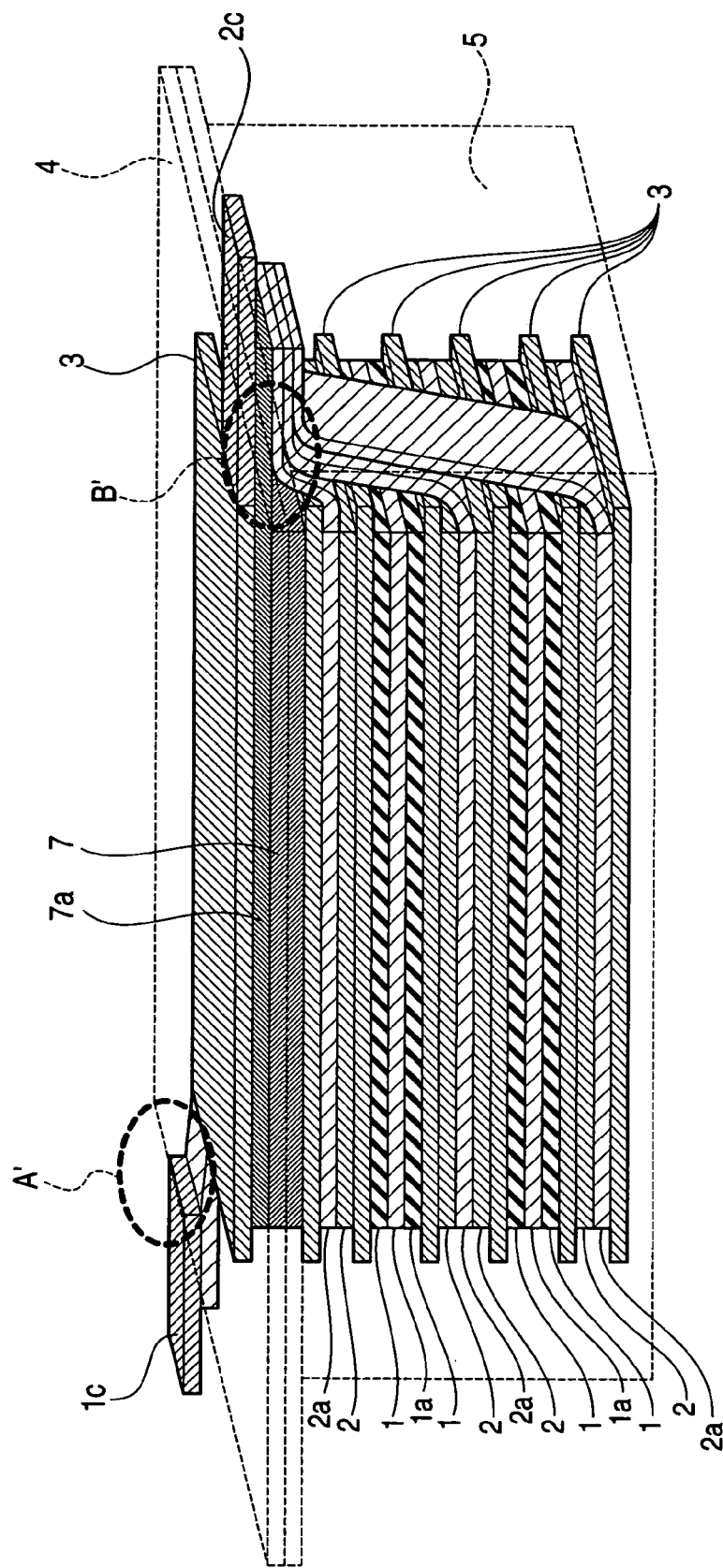
FIG. 1 is a perspective view showing a first embodiment.

Hereinafter, reference numerals in the accompanying drawings will be described.

Reference numeral 1 indicates a positive electrode active material layer. Reference numeral 2 indicates a negative electrode active material layer.

Reference numeral 1a indicates a positive electrode current collector.

Reference numeral 2a indicates a negative electrode current collector.

Reference numeral 1b indicates a conductive material (positive electrode).

Reference numeral 2b indicates a conductive material (negative electrode).

Reference numeral 1c indicates a positive terminal.

Reference numeral 2c indicates a negative terminal.

Reference numeral 3 indicates a separator.

Reference numeral 4 indicates a laminated film.

Reference numeral 5 indicates a (deep-drawn) laminated film.

Reference numeral 6 indicates an electrode-laminated unit.

Reference numeral 7 indicates a lithium electrode.

Reference numeral 7' indicates a lithium electrode current collector.

Reference numeral 8 indicates a three-electrode-laminated unit.

Reference numerals 9a and 9b indicate conducting wires.

Reference numeral 10 indicates a roll-type electric unit.

Referential symbol A indicates a thermal bonding portion between the positive terminal and an exterior film.

Referential symbol B indicates the thermal bonding portion between the negative terminal and the exterior film.

Referential symbol C indicates the thermal bonding portion of the exterior film.

Referential symbol D indicates a through-hole, from which the electrode drops out.

Referential symbol A' indicates a welding portion between a terminal welding portion of the positive electrode current collector and the positive terminal.

Referential symbol B' indicates the welding portion between the thermal welding portion of the negative electrode current collector (lithium electrode current collector) and the negative terminal.

EMBODIMENTS OF THE INVENTION

An organic electrolyte capacitor according to an aspect of the present invention is an organic electrolyte capacitor including positive electrodes, negative electrodes and an electrolyte capable of transferring lithium ion, in which the positive electrodes contain a substance as a positive electrode active material capable of carrying lithium ions and/or anions reversibly, the negative electrodes contain a substance as a negative electrode active material capable of carrying lithium ions reversibly, and the positive and negative electrodes have the positive and negative electrode active material layers provided on an electrode substrate that has a conductive layer made of a conductive material on current collectors, which have through-holes that penetrate the front and rear surfaces. Also, the organic electrolyte capacitor is characterized in that the negative electrode carries lithium ion electrochemically.

In an aspect of the invention, it is preferable that a positive or negative electrode active material layer be formed on an electrode-substrate, in which at least part of through-holes of positive and negative electrode current collectors are blocked with conductive materials previously, so as to form positive and negative electrode.

Figure 2:
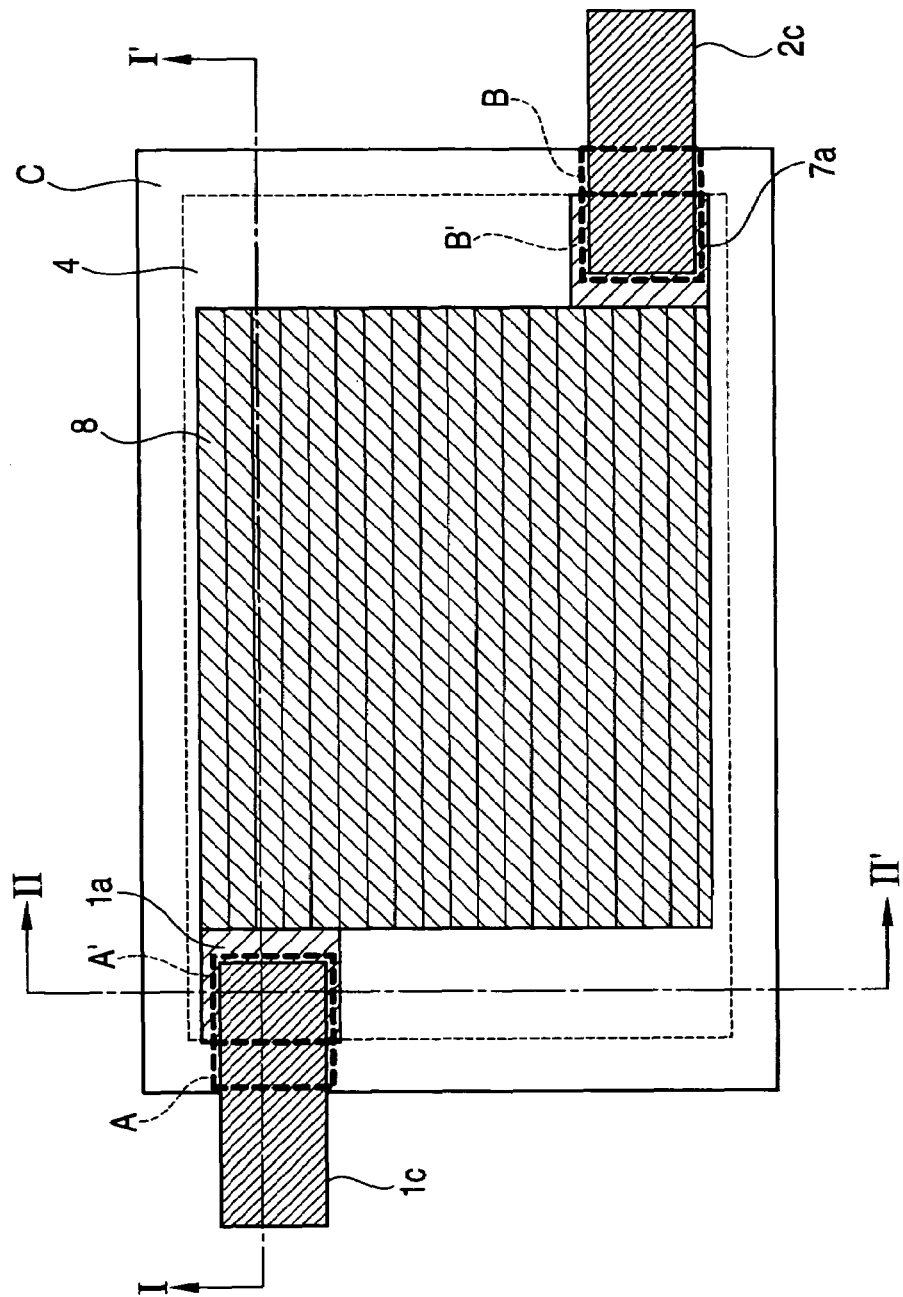
FIG. 2 is a plan view showing the first embodiment.
Figure 3:
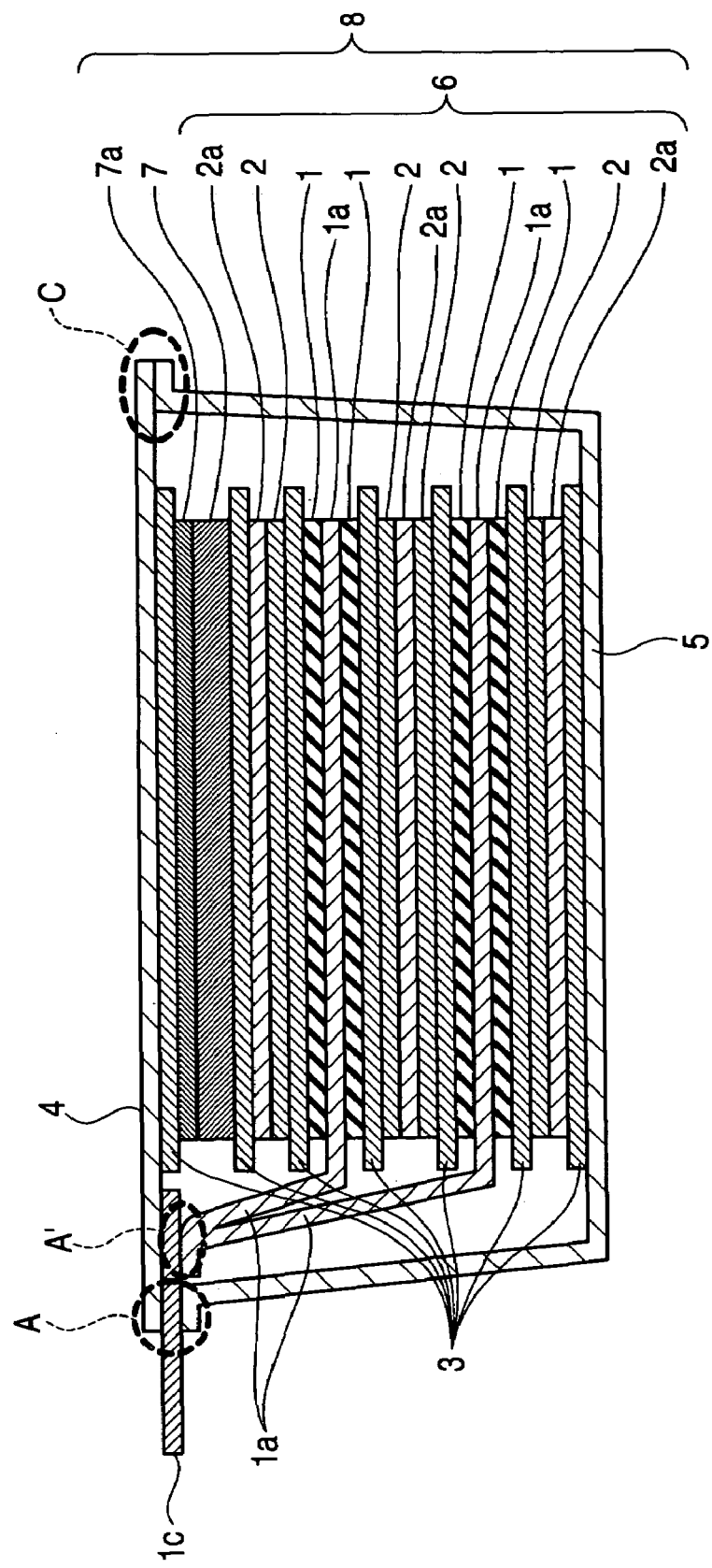
FIG. 3 is a cross-sectional view taken along I-I' shown in FIG. 2.
Figure 4:
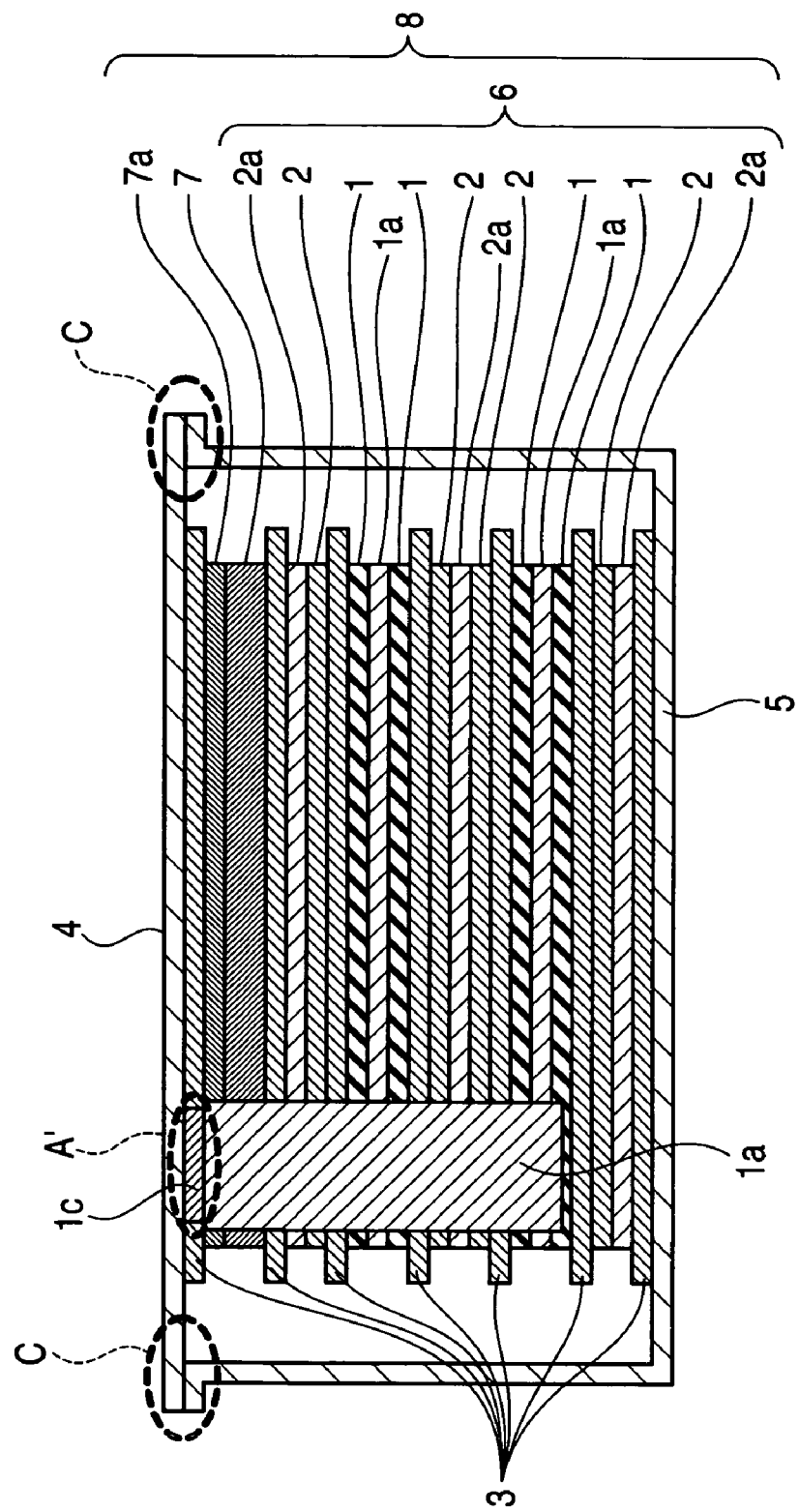
FIG. 4 is a cross-sectional view taken along II-II' shown in FIG. 2.

First, the internal structure of the organic electrolyte capacitor according to the aspect of the invention will be described. FIG. 1 is a perspective view showing the internal structure of the organic electrolyte capacitor according to the aspect of the invention, in which a laminated film is used as an exterior container. In FIG. 1, the internal structure of the organic electrolyte capacitor is expressed by solid lines, and the exterior container of the organic electrolyte capacitor is expressed by broken lines. FIG. 2 is a plan view of FIG. 1, FIG. 3 is a cross-sectional view taken along I-I' shown in FIG. 2, and FIG. 4 is a cross-sectional view taken along II-II' shown in FIG. 2.

The organic electrolyte capacitor shown in FIG. 1 has a structure in which a three-electrode-laminated unit having laminated positive electrodes, negative electrodes, a lithium electrode 7 and separators 3, is provided in laminated films 4 and 5, an electrolytic solution capable of transferring lithium ions is injected, and then two laminated films 4 and 5 are sealed by thermal-bonding and the like. In the aspect of the invention, the electrodes (positive and negative electrodes) have conductive layers (positive electrode conductive layer 1b, negative electrode conductive layer 2b) that are made of conductive materials on electrode current collectors (positive electrode current collector 1a, negative electrode current collector 2a) having holes that penetrate front and rear surfaces (the conductive layers are not shown in FIG. 1), and electrode active material layers (positive electrode active material layer 1, negative electrode active material layer 2) on the conductive layers. 'The positive electrode' is an electrode, from which electric current flows during discharging, and into which electric current flows during charging, and 'the negative electrode' is an electrode, into which electric current flows during discharging, and from which electric current flows during charging.

As shown in FIG. 1, the positive and negative electrodes are laminated with the separator 3 interposed there between, which prevents the direct contact between the electrodes, so as to form an electrode-laminated unit 6. A lithium electrode 7, which is formed by pressing and sticking a lithium metal to a surface of the lithium electrode current collector 7a, is disposed on the electrode-laminated unit 6 with the separator 7 interposed therebetween so as to form the three-electrode-laminated unit.

In the aspect of the invention, the electrode current collectors (positive electrode current collector 1a, negative electrode current collector 2a) and the lithium electrode current collector 7a have holes that penetrate the front and rear surfaces respectively, (through-holes are not shown in FIG. 1) and the holes are blocked with conductive materials.

Therefore lithium ions can move freely between the electrodes through the through-holes blocked with the conductive materials.

Figure 5:
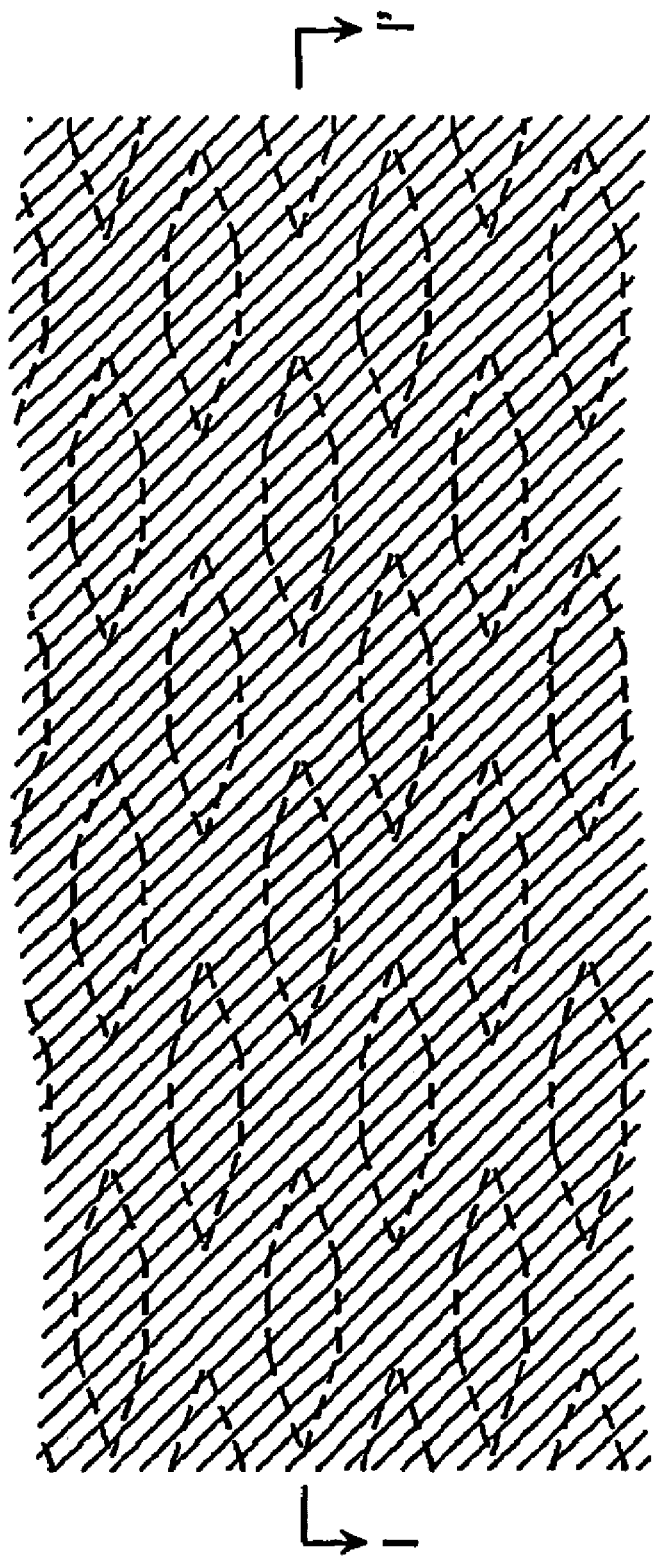
FIG. 5 is an enlarged plan view showing an example of an electrode current collector, onto which the electrode has been formed.
Figure 6:
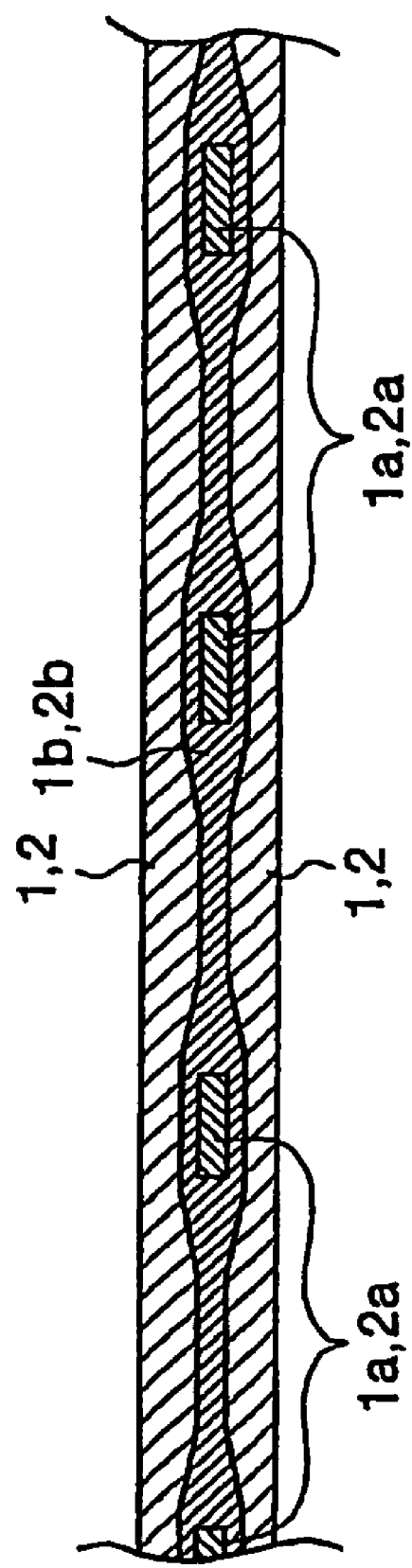
FIG. 6 is a cross-sectional view taken along I-I' shown in FIG. 5.

FIG. 5 is an enlarged plan view of the electrode substrate (current collector+conductive layer), on which an electrode active material layer is formed. In FIG. 5, an expanded metal is used as the current collector, and hexagonal portions surrounded by dotted lines are the through-holes. FIG. 6 is a cross-sectional view taken along the line I-I' shown in FIG. 5. As shown in FIG. 6, the through-holes of the expanded metal (positive electrode current collector 1a, negative electrode current collector 2a) are blocked with conductive materials 1b and 2b, and the positive and negative electrode active materials 1 and 2 are formed on the conductive layers that are formed on the expanded metal having through-holes which are blocked.

Figure 18:
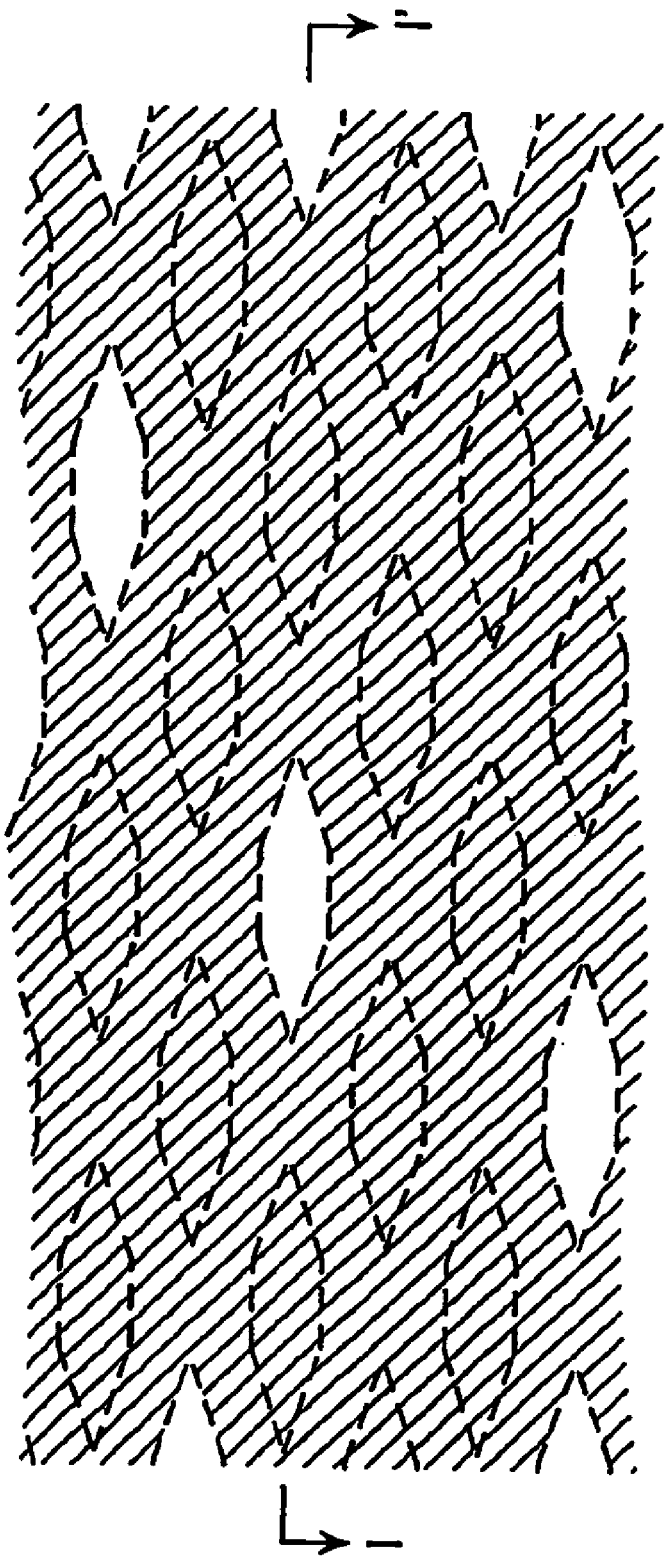
FIG. 18 is an enlarged plan view showing a conventional electrode current collector, onto which electrode has been formed.
Figure 19:
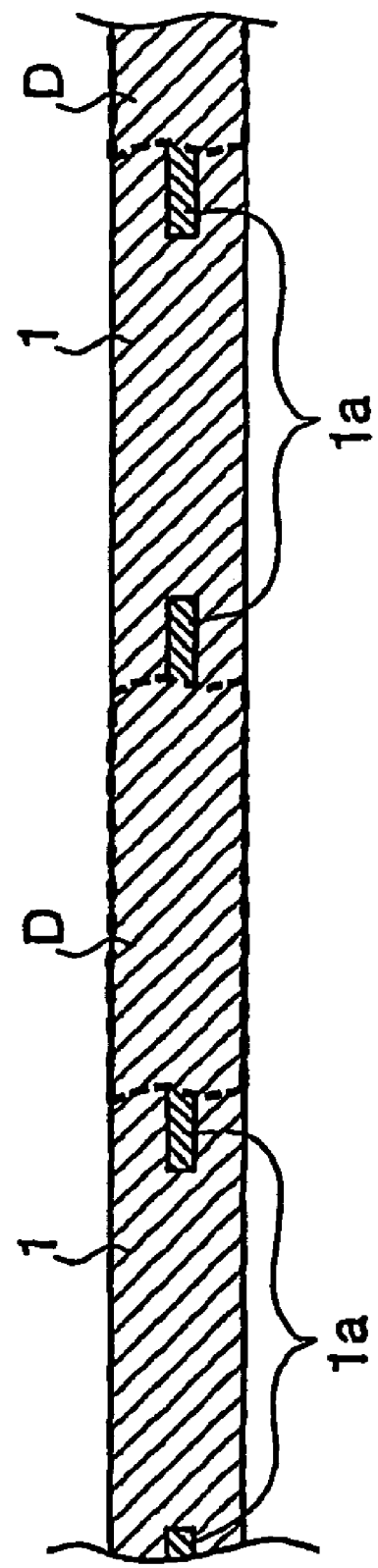
FIG. 19 is a cross-sectional view taken along I-I' shown in FIG. 18.

FIG. 18 is an enlarged plan view of a current collector having electrodes, which is used for a conventional organic electrolyte capacitor, and FIG. 19 is a cross-sectional view taken along the line I-I' shown in FIG. 18. As shown in FIG. 19, conventionally, the positive and negative electrode active material layers 1 and 2 are directly formed on the current collectors without blocking the through-holes of the positive and negative electrode current collectors 1a and 2a (expanded metal in this case).

However, a current collector that is made of, for example, expanded metal and has holes penetrating the front and rear surfaces thereof, has lower tensile strength than a metal foil hating the same thickness as the current collector but no hole. Therefore, a thick electrode current collector is required in an actual coating of an electrode active material, and this it is difficult to make the electrode thin. Also, when the electrode active material layer is coated on the current collector that has holes are open, the electrode material passes through the through-holes of the current collector. Therefore, it is difficult to uniformly coat on the current collector. In addition, the electrode active material layer formed on the through-hole of the current collector is likely to drop out (white portions in FIG. 18 and portions indicated by D in FIG. 19), whereby a short circuit can be induced in the battery, and reliability of the storage device can deteriorate.

According to the aspect of the invention, the conductive layers are formed on the positive and negative electrode current collectors 1a and 2a with conductive materials 1b and 2b before the positive and negative electrode active material layers 1 and 2 are formed. In addition, it is preferable to block at least part of the through-holes with conductive materials 1b and 2b previously, whereby the electrode active material layers can be formed easily on the through-holes. Since lithium ions can move through the conductive materials 1b and 2b, the movement of lithium ions is not impeded even when the through-holes are blocked with conductive materials. If conductive layers are formed with conductive materials on the current collectors having through-holes, and more preferably, if at least part of the through-holes are blocked with conductive materials, the tensile strength of the electrode substrate increases. Therefore, it is possible to use a thin current collector having a through-hole that penetrates the front and rear surfaces with a thickness of 10 to 40 μm and a porosity of 10 to 90%, in the coating of the electrode active material layer on actual equipment, and then thin electrodes can be manufactured. Also, the electrode active material layer formed on the through-holes can be held stably, whereby the conductivity of the electrode increases, and the falling of the electrodes active materials is prevented to repress short circuit in the battery. As described above, according to the aspect of the invention, it is possible to secure mobility of lithium ions, and to easily solve the problems of the related.

When an electrolytic solution is injected during the assembly of a battery, all negative electrodes 2 come in electrochemical contact with the lithium electrode 7, and then lithium ions that is eluted from the lithium electrode 7 into the electrolyte are carried smoothly to all negative electrodes 2 through the through-holes of the lithium electrode current 7a, the positive electrode current collector 1a and the negative electrode current collector 2a.

Although the electrode-laminated unit 6 includes four positive electrode active material layers 1 and four negative electrode active material layers 2 in FIG. 3, the structure of the electrode-laminated unit 6 is not limited thereto, and if the electrode-laminated unit 6 includes at least one positive electrode layer and one negative electrode layer, the number of each of the positive and negative electrodes is not limited.

Although the lithium electrode 7 is disposed on the electrode-laminated unit 6 so as to form the three-electrode-laminated unit 8, the position, the number and the shape of the lithium electrode 7 are not limited. However, it is preferable to dispose the lithium electrode 7 to face the positive or negative electrode to carry lithium ions smoothly in the above structure. For example, the lithium electrode 7 can be stuck directly to the negative electrode. When the lithium electrode 7 is stuck directly to the negative electrode, lithium ions are carried to an adjacent negative electrode active material layer 2 directly. However, lithium ions should pass through at least one layer of the current collector to be carried to the rest of negative electrode active material layers 2 other than the adjacent negative electrode active material layer 2.

The lithium electrode 7 is provided in order to supply lithium ions to the negative electrode. Therefore, the lithium electrodes 7 should be provided enough to make the negative electrode obtain target capacitance.

As the lithium electrode 7 discharges lithium ions, the amount of the lithium electrode 7 decreased gradually. For this reason, it is preferable that conductive and porous members such as a stainless steel mesh and the like be used as the lithium electrode current collector 7a, and porous portions of the lithium electrode current collector be blocked with at least a part of the lithium electrode 7. Then the number of openings induced by the loss of the lithium electrode between electrodes decreases even when lithium ions are carried to the electrode from the lithium electrode 7, whereby lithium ions are carried to the electrode active material smoothly.

In the organic electrolyte capacitor according to the aspect of the invention shown in FIG. 1, the separators 3 are provided among the positive electrodes, the negative electrodes, and the lithium electrode 7 in order to prevent the direct contact of the electrodes. A cell is filed with the electrolyte capable of transferring lithium ion, and even the separators 3 separating the electrodes are also impregnated with the electrolyte. Generally, the electrolyte is used in a liquid state, that is, the electrolyte is dissolved in a solvent, and impregnated into the separators 3. However, when the separators 3 are not used, the electrolyte can be used in a gel or solid state in order to prevent the direct contact between the positive and negative electrodes and the leakage of the electrolyte.

As shown in FIG. 2, each of the positive electrode current collectors 1a have a drawn portion, which includes a terminal connecting portion A', and the terminal welding portions A' (two pieces) of the positive electrode current collectors 1a are welded to a positive terminal 1c. In addition, each of the negative electrode current collector 2a and the lithium electrode current collector 7a have a drawn portion, which includes a terminal connecting portion B', and the terminal welding portions B' (three pieces) of the negative electrode current collectors 2a and the terminal welding portion B' (one piece) of the lithium electrode current collector 7a are tied up with each other, and then welded to a negative electrode terminal 2c.

The laminated films 4 and 5 are sealed with the positive electrode terminal 1c and the negative electrode terminal 2c interposed therebetween. The positive electrode terminal 1c and the negative electrode terminal 2c are thermally bonded to the laminated films 4 and 5 at the thermal bonding portions A and B that are shown in FIG. 2. That is, the organic electrolyte capacitor is sealed at the thermal bonding portions A and B between the laminated films 4 and 5 and the respective terminals and the thermal bonding portion C between the laminated films 4 and 5 is an example of FIG. 2. Therefore, the positive electrode terminal 1c and the negative electrode terminal 2c project from between the laminated films 4 and 5 to the outside of the capacitor, and the positive electrode active material layer 1 can be connected with an external electric circuit through the positive electrode terminal 1c, and the negative electrode active material layer 2 and the lithium electrode 7 can be connected with the external electric circuit through the negative electrode terminal 2c.

Although the shape and size of the positive and negative electrode terminals 1c and 2c are not limited, it is preferable that the terminals be as thick and wide as possible in a limited volume of the cell on the condition that sufficient airtightness can be secured, then the resistance of the terminals decrease. Also, it is preferable to take the shape and size of the terminals properly according to the target characteristic of the cell.

Hereinafter, the organic electrolyte capacitor according to the aspect of the invention will be described in detail in the following order.

[A] Electrode substrate
(A-1) Positive and negative electrode current collectors
(A-2) Conductive materials
(A-3) Manufacturing method of the electrode substrate
[B] Negative electrode
[C] Positive electrode
[D] Lithium electrode
[E] Electrolyte
[F] Exterior container
[G] Principles of the organic electrolyte capacitor
[H] Detailed examples of the internal structure
[I] Manufacturing method of the organic electrolyte capacitor

[A] Electrode Substrate

The electrode substrate is a supporting body that is coated with electrode materials containing electrode active materials and a binder to form electrodes. The electrode substrate includes conductive layers made of conductive materials on at least one surface of a current collector having through-holes that penetrate the front and rear surfaces.

In the aspect of the invention, the positive and negative electrode current collectors have through-holes that penetrate the front and rear surfaces, and the conductive layers are formed on the electrode current collectors (positive electrode current collector, negative electrode current collector). In addition, it is preferable that at least part of the through-holes be blocked with conductive materials that are different from positive and negative electrode materials before positive and negative electrode active material layers 1 and 2 are formed.

In the organic electrolyte capacitor according to the aspect of the invention, it is preferable that the positive and negative electrode active material layers 1 and 2 be formed by coating and drying electrode materials (positive electrode material, negative electrode material) on the electrode substrate, in which the current collectors 1a and 2a are coated with the conductive layers are coated. The electrode materials are made by mixing the electrode active materials (positive electrode active material, negative electrode active material) having shapes that are easy to shape such as powder, granule, staple and the like with a binder resin and a solvent. It is also preferable that the amount of the electrode active material takes more portions of the solid weight of the electrode materials, since the capacity of the organic electrolyte capacitor increases. However, when the properties (for example, viscosity or thixotropy) of the electrode materials are adjusted to be held on the collectors having the through-holes, there is a problem in that it becomes difficult to take the best advantage of the active materials.

FIG. 18 is an enlarged plan view of an electrode current collector having electrodes that is used in a conventional organic electrolyte capacitor. Conventionally, since the positive electrode active material layer 1 and the negative electrode active material layer 2 are directly formed on the current collectors 1a and 2a without blocking the through-holes of the current collectors 1a and 2a, the electrode active material layers that are formed on the through-holes of the electrode collectors, specially edge portions (end portions of the electrode current collectors), can fall off easily, therefore a short circuit can be induced in the battery. On the other hand, if the amount of the binder resin considerably increases in the electrode materials in order to prevent from falling off the electrode active material layers 1 and 2, there is a problem in that the capacity and characteristic of the organic electrolyte capacitor deteriorate.

In the aspect of the invention, the conductive layers 1b and 2b are formed on the electrode current collectors 1a and 2a, and more preferably, at least part of the through-holes of the electrode current collectors 1a and 2a are blocked with conducting materials that do not easily fall off before the electrode active material layers 1 and 2 are formed. Therefore, the productivity of the electrodes can be improved, and a problem of reliability deterioration due to the loss of the electrode active material layers can be solved. In addition, high energy density and high power density can be realized by making the thickness of the electrodes including the electrode current collectors thin.

(A-1) Positive and Negative Electrode Current Collectors

The positive and negative electrode current collectors include holes penetrate the front and rear surfaces. For example, bodies having holes that penetrate the front and rear surfaces such as an expanded metal, punching metal, metal net, foam and the like, which have preliminary through-holes, or porous foils and the like, in which through-holes can be formed by etching can be used as the positive and negative electrode currents collectors having the through-holes that penetrate the front and rear surfaces.

Also, various materials that are generally proposed for the use of organic electrolyte batteries and the like can be used as materials for the electrode current collectors. That is, aluminum, stainless steel and the like can be used for the positive electrode current collector, and stainless steel, copper, nickel and the like can be used for the negative current electrode collector.

The thickness of the electrode current collector used in the aspect of the invention is usually in the range of 10 to 39 µm. However, it is preferable to be in the range of 10 to 35 µm, more preferable in the range of 10 to 30 µm, and most preferable in the range of 10 to 25 µm. When the electrode current collectors are too thick, the electrode generally becomes too thick, and since the amount of the electrode active material decreases in the entire electrode, it is not preferable that the energy density or power density per unit weight or unit volume of the organic electrolyte capacitor decreases. Also, there is a defect that the workability deteriorates in coating of the electrode material. In addition, when the electrode current collectors are too thin, the strength of the electrode decreases. Therefore, the electrode current collectors can break down or wrinkles can be induced during the coating of the electrode materials. For this reason, it is difficult to manufacture uniform and reliable electrodes.

The thickness of the positive and negative electrode current collectors can be equal. However, when the positive and negative electrode current collectors are made of different materials, it is preferable that one having a heavier specific gravity be made thinner than the other since the weight per unit volume of the cell decreases. Therefore, in the invention, if aluminum is used for the positive electrode current collector, and copper is used for the negative electrode current collector, it is preferable to make the negative electrode current collector thinner than the positive electrode current collector.

The shape, number and the like of the through-holes of the current collectors can be adjusted to make lithium ions in an electrolytic solution, which will be described below, freely move between the front and rear surfaces of the electrodes without being blocked by the current collectors and to be easily blocked with conductive materials.

The porosity of the electrode current collector is defined as a value obtained by converting a ratio of {1-(the weight of the current collector/the true specific gravity of the collector)/(the bulk volume of the current collector)} into a percentage. The porosity of the electrode current collector used in the aspect of the invention is generally in the range of 10 to 90%, preferably in the range of 10 to 79%, more preferably in the range of 20 to 60%, further preferably in the range of 30 to 50%, and most preferably in the range of 35 to 45%.

When the porosity of the electrode current collector is high, lithium ions can be uniformly carried to the negative electrode in a short time. However, the strength of the current collector decreases, and wrinkles can be easily induced in the current collector or the current collector can breakdown easily. In addition, it becomes difficult to hold conductive materials in the through-hole, therefore the manufacturing yield of the electrode decreases due to the dropout of the conductive materials, the breakdown of the electrode and the like.

On the other hand, when the porosity of the electrode current collector is low, there are problems in that it takes a long time to carry lithium ions to the negative electrode, whereby the manufacturing efficiency decreases and enhanced scatter in cell characteristics is expected. However, the strength of the current collector increases, and the active materials do not fall off easily, therefore the manufacturing yield of the electrode increases. It is desirable to decide the porosity or pore diameter of the current collector properly within the above-mentioned range in consideration of the structure (laminated type, roll type and the like) or productivity of the capacitor.

Figure 7:
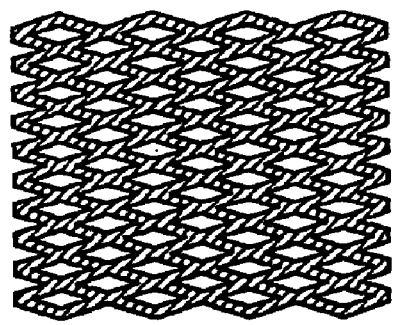
FIG. 7 are enlarged plan views showing examples of the electrode current collectors, onto which (A) is an expanded metal, (B) is a metal net, and (C) to (E) are punching metals.
Figure 7:
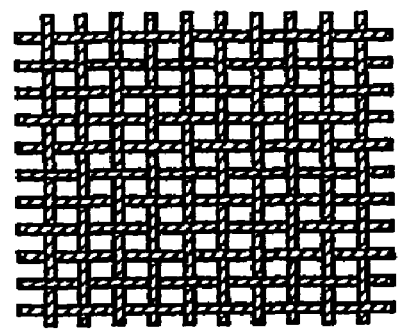
Figure 7:
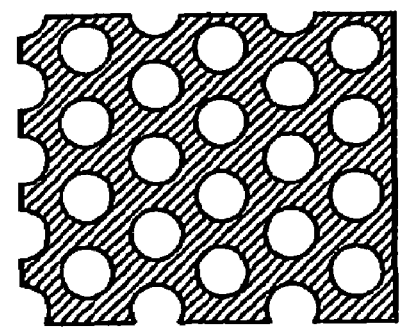
Figure 7:
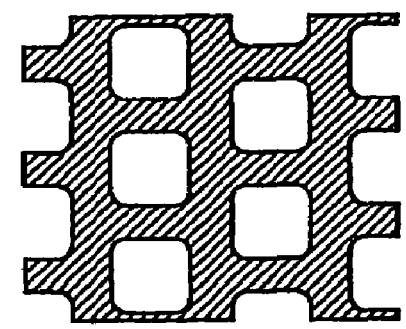
Figure 7:
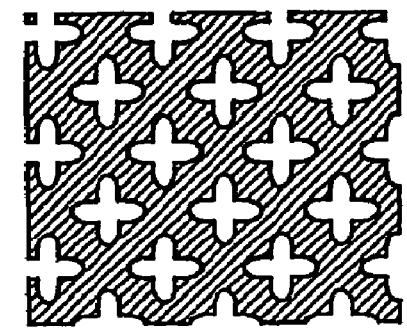

FIG. 7 shows examples of the electrode current collector. FIG. 7A shows an example of an expanded metal having porosity of 38%. FIG. 7B shows an example of a metal net having porosity of 37%. FIG. 7C shows an example of a punching metal having porosity of 34%. Although each of the through-holes has a circular shape in the example shown in FIG. 7C, the shape of the through-holes is not limited thereto. For example, a rectangular shape (porosity of 45%) shown in FIG. 7D, a shape of a cross (porosity of 35%) shown in FIG. 7E, or the like can be employed as the shape of the through-holes. It is preferable that the area of each of the through-holes is set to be easily blocked with conductive material. Area per one through-hole is preferably less than 15 $mm^2$, more preferable less than 10 $mm^2$, and most preferably less than 5 $mm^2$.

(A-2) Conductive Materials

In the aspect of the invention, a conductive material satisfying the following conditions may be used as the conductive material that blocks the holes of the electrode current collectors and is specially not limited other than the following conditions: ① it is different from the conductive materials of the positive and negative electrode active material layers, ② it does not more fall off out from the through-holes in comparison to a case where the positive and negative electrode active material layers are directly formed on the positive and negative electrode current collectors, and ③ lithium ion can pass through it.

In the aspect of the invention, a conductive material different from that of the positive electrode active material layer is used as a conductive material of the positive electrode current collector. In the aspect of the invention, 'a conductive material different from that of the positive electrode active material layer' means a conductive material having a composition different from that of the positive electrode active material layer. Therefore, even when a material contains the same substances with the positive electrode active material, conducting agent and binder resin contained in the positive electrode active material layer if the material has a composition ratio different from that of the positive electrode active material layer, the material does not more easily fall off from the through-holes in comparison with the positive electrode active material layer, and lithium ions can pass through the material, the material can be used as a conductive material of the positive current collector. Meanwhile, the composition means the compositions of the conductive material and the positive electrode active material layer after being formed on the electrode current collectors, not the compositions of those before being formed on the electrode current collectors (for example, the composition of the conductive material to which a solvent is added in order to have a proper concentration for coating). It is preferable to use a conductive material containing larger amount of a binder resin that the positive electrode active material layer in order to prevent the conductive material from easily falling off from the through-holes in comparison with the positive electrode active material layer.

In addition, in the aspect of the invention, a conductive material different from that of the negative electrode active material layer is used as a conductive material of the negative electrode current collector. In the aspect of the invention, 'a conductive material different from that of the negative electrode active material layer' means a conductive material having a composition different from that of the negative electrode active material layer. Therefore, even when a material contains the same substances with the negative electrode active material, conducting agent and binder resin contained in the negative electrode active material layer if the material has a composition ratio different from that of the negative electrode active material layer, the material does not more easily fall off from the through-holes in comparison with the negative electrode active material layer, and lithium ion can pass through the material, the material can be used as a conductive material of the negative current collector. Meanwhile, the composition means the compositions of the conductive material and the negative electrode active material layer after being formed on the electrode current collections, not the compositions of those before being formed on the electrode current collectors. It is preferable to use a conductive material containing larger amount of a binder resin than the negative electrode active material layer in order to prevent the conductive material from more easily falling off from the through-holes in comparison with the negative electrode active material layer.

The above-mentioned conductive materials contain mainly conducting agents and binder resins. The types, compositions and the like of the conducting agents and binder resins can be adjusted to satisfy the above ① to ③ conditions.

Examples of the conducting agent used in the conductive materials may include various carbon materials such as graphite including natural graphite or artificial graphite, cokes, pitch, resins, plants or the like, carbon blacks such as acetylene black, Ketjenblack or the like, polyacene-based materials, stannates, silicates and the like, which can be used as the negative electrode active material described below. Further, metal powders such as metallic nickel and the like may be used. Among these, particularly preferred conducting agents may include graphite, acetylene black, Ketjenblack and the like.

In addition, any substance that is insoluble in the organic electrolytic solutions described below can be used as the binder resin used in the conductive materials, for example, aqueous resins that use water as a dispersing medium or solvent, or non-aqueous resins that use organic solvents such as alcohols or N-methylpyrrolidone as a dispersing medium or solvent can be used. For example, rubber-based binder resins such as SBR and the like, carboxymethylcellulose-based resins or the like are aqueous resins, and phenolic resins or melamine resins can be used as aqueous or non-aqueous resins depending on the composition.

In addition, acrylic resins, polyamide resins, polyethylene resins or the like can be used as the aqueous resin by emulsifying them. Meanwhile, representative examples of the non-aqueous resins are fluorine-containing resins such as polytetrafluoroethylene or polyfluorovinylidene, polyimide resins, and polyamideimide copolymer resins. Among the above substances, it is preferable to use a non-aqueous polyamideimide resin, since the conductive material is adhered to the electrode current collector so as to have seldom fall off. Also, when an electrode active material layer using an aqueous binder described below is formed on the conductive layer using a non-aqueous binder, the electrode active material layer is coated and adhered satisfactorily, whereby the electrode can obtain excellent uniformity and reliability.

It is preferable to use a conductive material containing larger amount of a binder resin than the positive and negative electrode active material layer in order to prevent the conductive material from easily falling off. However, when too much binder resins is contained in the conducting material, lithium ion cannot pass through the conductive material easily, whereby it takes a long time for lithium ion carrying or charging and discharging. It is possible to obtain a conductive material that does not easily fall off from the through-holes by setting the amount of the binder resin contained in the conductive material within the range. Therefore, lithium ion can move freely, and the object of the invention can be achieved.

In the aspect of the invention, it is preferable that the thickness of the conductive layer be in the range of 1 to 20 μm, more preferably in the range of 2 to 10 μm, most preferably in the range of 3 to 7 μm in order to increase the energy and power per unit weight or unit volume by making the electrode thin, and in order to form the conductive layer and block the through-holes with the conductive material.

(A-3) Manufacturing Method of the Electrode Substrate

Next, two manufacturing methods of the electrode substrate having the conductive layers on the electrode current collectors will be described as examples.

In the first method, first conductive layer, which is made of a conductive material and has many through-hole, is formed on a surface of an imperforate metal foil, and second conductive layer, which is made of a conductive material and has holes or no holes, is formed on the other surface of the imperforate metal foil so as to form a three-layer laminate. After that, the laminate is etched to form through-holes in the imperforate metal foil.

In the second method, the electrode current collectors previously having through-holes (for example, an expanded metal, punching metal, metal net, foam and the like) are coated with well-known methods and the like to form the conductive layers.

The first method can be performed as follows. That is, a perforated conductive layer, which has many holes and is made of a conductive material, is formed on a surface of an imperforate metal foil such as aluminum, copper and the like with, for example, a gravure printing and the like, and an imperforate or perforate conductive layer is formed on one surface of the imperforate metal foil with the gravure printing and the like in the same manner as the former conductive layer so as to form a three-layer structure. The imperforate metal foil is etched with an etching solution that etches only the metal foil to form many through-holes that correspond to the holes of the conductive layer. In this case, it is preferable to use a coating material that is a mixture of one of polyimide resin, polyamide resin, a combination of the polyimide and polyamide resins, or the like and a conducting agent, and has conductivity as a material that is made of a conductive material and used for the perforate conductive layer, since the shape, distribution and the like of the holes can be properly designed.

In the case of a current collector having through-holes obtained by etching after the conductive layer is coated on the imperforate electrode current collector, since the conductive layer is coated before the through-holes are formed, the strength of the current collector can be held even when the current collector is thin. Therefore, the first method is an extremely effective manufacturing method of the perforate current collector having practical strength despite the thickness of below 39 μm.

The second method can be performed as follows. A conductive layer is formed on the electrode current collector by using well-known coating methods such as die method, dipping method, spray method and the like and well-known printing methods such a gravure, screen, transfer and the like. The through-holes can be blocked with the conducting material by supplying the conducting material to the electrode current collector under a proper setting of the conditions. When the conductive material is adjusted by adding the binder resin to the conducting agent, it is preferable to add an organic solvent, water or the like according to the binder resin in order to adjust properly the viscosity of the conductive material to the used method to apply the conductive material.

For example, in the case of using a coating method, the conductive material containing the conducting agent and the binder resin is diluted into a proper concentration with a solvent to adjust the coating solution, and then the coating solution is coated and dried on the current collector having through-holes. Then, the through-holes of the electrode current collector can be blocked. Although the proper concentration, at which the through-holes of the electrode current collector can be blocked easily, varies with the types of binder resins used, generally, it is preferable that the concentration be in the range of about 25 to 30% by solid content (viscosity of about 1000 cps). It is preferable that the average thickness of the coated conductive material be in the range of 1 to 20 μm (per one surface), more preferably in the range of 2 to 10 μm. If the thickness of the coated conductive material is too thin, the through-holes cannot be blocked, and if the thickness of the coated conductive material is too thick, the electrode current collector becomes thick, whereby the performance of the electrode deteriorates.

Figure 8:
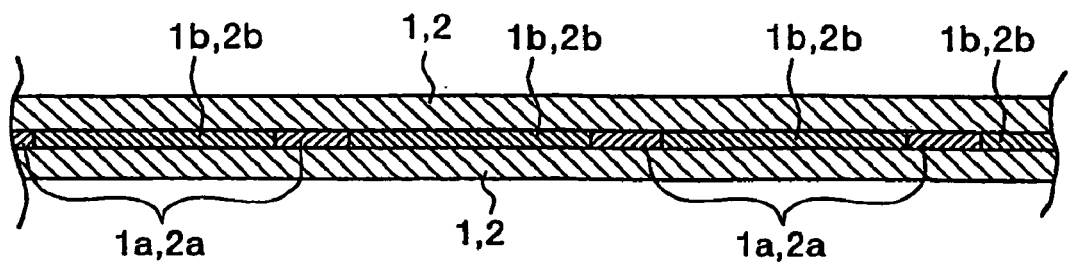
FIG. 8 is an enlarged cross-sectional view showing another example of the electrode current collector, onto which the electrode has been formed.
Figure 9:
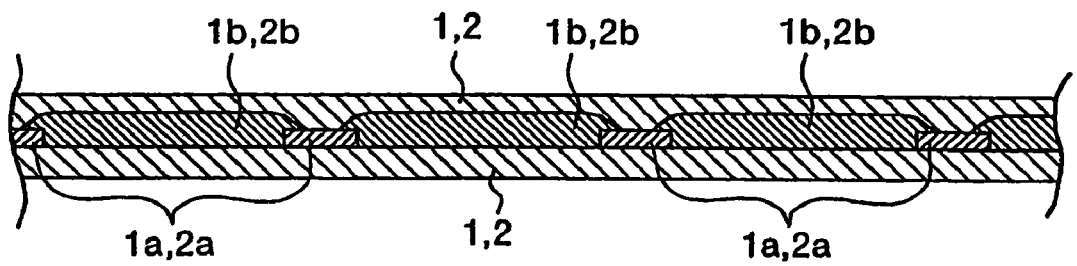
FIG. 9 is an enlarged cross-sectional view showing another example of the electrode current collector, in which the electrode has been formed.

When both surfaces of an electrode current collector are coated with the conductive materials, as shown in FIG. 6, the through-holes of the electrode current collectors 1a and 2a are blocked with the conductive materials 1b and 2b, and the whole surfaces of the electrode current collector are coated with the conductive materials. The blocked state of the through-holes in the electrode current collector does not matter. For example, as shown in FIG. 8, only through-holes of the electrode current collector can be filled with the conductive material by coating the surface of the electrode current collector with the conductive material, and then wiping the remaining coating material on the surface of the electrode current collector. Also, as shown in FIG. 9, the through-holes of the electrode current collector may be blocked by injecting the conductive material to the through holes of the electrode current collector with the use of the screen-printing method and the like.

As described above, in the aspect of the invention, it does not matter what method is used to block the through-holes of an electrode current collector. However, it is preferable that over 80% of the area of the through-holes in the electrode current collector be blocked, and it is more preferable that over 90% thereof be blocked.

[B] Negative Electrode

In the organic electrolyte capacitor according to the aspect of the invention, the negative electrode contains the negative electrode active material that can carry lithium ions reversibly. In the aspect of the invention, the negative electrode active material layer 2 is formed by adding the conducting agent, the binder resin and the like to the negative electrode active material according to need.

Any substance capable of carrying lithium ions reversibly can be used as the negative electrode active material of the invention. For example, various carbon materials that are obtained from graphite, natural or synthetic, cokes, pitch, thermosetting resin, palm husk, tree and the like can be used, carbon fiber, polyacene-based substance, tin oxide, silicon oxide and the like.

Lithium ions have a small ionic radius. Therefore, it is preferable that the above material be carbonized and processed under specific conditions, and the structure of the above material be controlled to transfer lithium ions effectively in order to be used as the negative electrode active material.

Among the above substances, polyacene-based organic semiconductor (PAS) has an amorphous structure and does not change the structure, that is, expansion or contraction even when lithium ions are inserted or desorbed, whereby PAS has a superior cycle characteristic. Also, PAS has an isotropic molecular structure (hyper-structure) to the insertion and desorption of lithium-ions, and thus the PAS has a superior characteristic of fast charging and fast discharging, whereby PAS is very suitable for the negative electrode active material. In the aspect of the invention, it is preferable to use an insoluble and infusible substance that is a thermally treated aromatic condensation polymer and has a polyacene skeletal structure, hydrogen/carbon atomic ratio of which is in the range of 0.50 to 0.05, as the negative electrode active material.

Herein, the aromatic condensation polymer means a condensate of an aromatic hydrocarbon compound with an aldehyde. Phenols such as phenol, cresol, xylenol and the like can be properly used as the aromatic hydrocarbon compound.

Also, a modified aromatic condensation polymer such as a condensate of phenol, xylene and formaldehyde, which is a part of the aromatic hydrocarbon compound having a phenolic hydroxyl group substituted by an aromatic hydrocarbon compound having no phenolic hydroxyl group such as xylene, toluene, aniline or the like, can be used as the aromatic condensation polymer. In addition, a modified aromatic polymer substituted with melamine or urea can be used, and furane resins are also preferred.

Aldehydes such as formaldehyde, acetaldehyde, furfural and the like can be used as the aldehyde, and formaldehyde is preferred among the above substances. Also, either a novolac-type or a resole-type or a mixture thereof can be used as the phenol-formaldehyde condensate.

The above-mentioned insoluble and infusible base substance is a thermally treated aromatic condensation polymer. Therefore, it is possible to use an insoluble and infusible base having a polyacene skeletal structure, which is described in JP-A Nos. 1-44212 and 3-24024.

The insoluble and infusible base substance used; in the aspect of the invention shows X-ray diffraction (CuKα) main peak of 2θ, below 24°, and another broad peak in the range of 41 to 46°. That is, the X-ray diffraction result illustrates that the insoluble and infusible base substance has a polyacene-based skeletal structure, in which aromatic polycyclic structure is developed properly, and an amorphous structure, whereby lithium ions can be stably doped. Therefore, the insoluble and infusible base substance is useful for an active material of the organic electrolyte capacitor according to the aspect of the invention.

Further, carbonaceous materials such as acetylene black, Ketjenblack, graphite and the like or metal powder can be added to the negative electrode active material according to need.

It is preferable that the negative electrode active material layer according to the aspect of the invention contain the negative electrode active material such as a carbonaceous material or PAS having a shape that is easy to shape such as powder, granule, filament or the like and is shaped by the binder resin. Any substance that is insoluble in the organic electrolytic solutions described below may be used as the binder resin used in the conductive materials, for example, aqueous resins that use water as the dispersing medium or solvent, or non-aqueous resins that use organic solvents such as alcohols or N-methylpyrrolidone as the dispersing medium or solvent can be used. For example, rubber-based binder resins such as SBR and the like, carboxymethylcellulose-based resins or the like are aqueous resins, and phenolic resins or melamine resins can be used as both aqueous and non-aqueous resins according to the composition.

In addition, acrylic resins, polyamide resins, polyethylene resins or the like can be used as the aqueous resin by emulsifying them. Meanwhile, representative examples of the non-aqueous resins are fluorine-containing resins such as polytetrafluoroethylene or polyfluorovinylidene, polyimide resins, and polyamide imide copolymer resins.

Among the above substances, fluorine-based or aqueous SBR-based resins, acrylic resins, and non-aqueous fluorine-based resins are preferred, and aqueous SBR-based resin or acrylic resin binder is particularly preferred when the conductive material is a non-aqueous resin binder.

In the aspect of the invention, it is preferable that the thickness of a single surface of the negative electrode active material layer be generally in the range of 15 to 100 μm, more preferably in the range of 20 to 80 μm, and the most preferably in the range of 25 to 50 μm. Also, it is preferable that the total thickness of the collector, conductive layers and electrode active material layers, when the current collector has the conductive layers and electrode active material layers on both surfaces, be in the range of 40 to 210 μm, more preferably in the range of 50 to 170 μm, and the most preferably in the range of 60 to 140 μm.

Although the thickness of the negative electrode active material layer is designed in balance with that of the positive electrode active material layer in order to secure the energy density of the cell, the active material can be used effectively if the thickness of the negative electrode active material layer decreases, and then the power density can be improved. On the other hand, when the thickness of the active material layer is too thin, the energy density decreases. Therefore, in the aspect of the invention, the thickness of the negative electrode active material layer can be determined properly in consideration of the industrial productivity.

It is preferable that the mixing ratio of the binder resin to the negative electrode active material be in the range of 1 to 20%, more preferably in the range of 2 to 10%, and the most preferably in the range of 2 to 5% by weight.

[C] Positive Electrode

In the organic electrolyte capacitor according to an aspect of the invention, the positive electrode contains a positive electrode active material that can carry lithium ions and/or anions such as tetrafluoroborate reversibly.

Any substance capable of carrying lithium ions and/or anions reversibly can be used as the positive electrode active material, and, for example, various activated carbons, which are activated by water vapor, carbon dioxide, and KOH or the like using cokes, pitch, resin, or palm husk or sawdust as the starting material, conductive polymers, polyacene-based materials, mesoporous carbons having highly developed mesopores with a pore diameter of 2.0 to 50 nm, or the like can be used as the positive electrode active material.

It is preferable to use among the above substances an insoluble and infusible base that is a thermally treated aromatic condensation polymer and has a polyacene skeletal structure, hydrocarbon/carbon atomic ratio of which is in the range of 0.50 to 0.05 in order to obtain high capacity. For example, PAS having the above-mentioned H/C and BET specific surface area of over 600 m$^2$/g can be used properly. The PAS can be made as follows. A solution containing an initial condensate of the aromatic condensation polymer and inorganic salts such as zinc chloride is made. The solution is heated and hardened in a molded to obtain a hardened body. The hardened body is heated slowly in a non-oxidative atmosphere (including a vacuum state) to a proper temperature in the range of 350 to 800° C., preferably in the range of 400 to 750° C., and washed sufficiently with water, diluted hydrochloric acid or the like. Then the PAS can be obtained.

In addition, a mesoporous carbon has remarkably developed pores in mesoporous regions in comparison with common activated carbons, and thus can move anions having large molecular diameters or solvated lithium ions fast, whereby a mesoporous carbon is the best suitable for the positive electrode active material of the organic electrolyte capacitor of the invention having high energy density and high power.

Generally, pores in a porous body are called as sub micropores for pores having diameters of below 0.7 nm, micropores for pores having diameters in the range of 0.7 to 2.0 nm, mesopores for pores having diameters in the range of 2.0 to 50 nm, and macropores for pores having diameters over 50 nm.

When an activated carbon is manufactured by a conventional method, a large number of micropores having the diameters of which are in the range of 0.7 to 2.0 nm, and sub micropores having the diameters of which are below 0.7 nm, are developed, and only small number of mesopores having the diameters in the range of 2.0 to 50 nm, are formed in the activated carbon, whereby the volume ratio of the mesopores is below 10%. Therefore, a common activated carbon has superior absorption ability for molecules having smaller sizes than 2.0 nm, however, it is not suitable to make faster the moving speed of the electrolyte of the organic electrolyte capacitor, organic or inorganic compound, and assembly of inorganic and organic compound, which is composed of solvated organic or inorganic compound, and has larger sizes than that of organic or inorganic compound.

Meanwhile, manufacturing methods or precursors of the mesoporous carbon that is used in the aspect of the invention are not limited, however, mesoporous carbon described in PCT/JP99/04541 and PCT/JP00/08575, in which the volume of pores having diameters of X.+α nm (3.0±X<10, α=1.0; distribution range of pore diameters) occupies over 15%, preferably 20 to 95%, the more preferably 30 to 95% of the total volume of mesopores having diameters in the range of 2.0 to 50 nm, can be used properly. For example, the mesoporous carbon can be manufactured by adding metals such as iron, cobalt, nickel and the like or metallic compound to carbon material or precursor of carbon, and then thermally treating the mixture at a high temperature of over 600° C. Also, the mesoporous carbon can be manufactured by a combination of the above method and usual activating methods such as water vapor activation, gas activation or the like.

In the aspect of the invention, the positive electrode active material layer is formed by adding conducting agent, binder resin, and the like to the positive electrode active material according to need, and the types, compositions and the like of the conducting agent and the binder resin can be determined properly.

For example, carbon blacks such as activated carbon, acetylene black, Ketjenblack, or the like and carbonaceous materials such as graphite can be suitably used as the conducting agent. The mixing ratio of the conducting agent varies with the electrical conductivity of the active material, the shape of electrode or the like, but it is preferable to be added in the proportion of 2 to 40% to the active material.

Any substance that is insoluble in the organic electrolytic solutions described below can be used as the binder resin, for example, aqueous resins that use water as the dispersing medium or solvent, or non-aqueous resins that use organic solvents such as alcohols or N-methylpyrrolidone as the dispersing medium or solvent can be used. For example, rubber-based binder resins such as SBR and the like, carboxymethylcellulose-based resins or the like are aqueous resins, and phenolic resins or melamine resins can be used as both aqueous and non-aqueous resins according to the composition. In addition, acrylic resins, polyamide resins, polyethylene resins or the like can be used as the aqueous resin by emulsifying them. Meanwhile, representative examples of the non-aqueous resins are fluorine-containing resins such as polytetrafluoroethylene or polyfluorovinylidene, polyimide resins, and polyamide.imide copolymer resins. Among the above substances, fluorine-based or aqueous SBR-based resins, acrylic resins, and non-aqueous fluorine-based resins are preferred, and aqueous SBR-based resin or acrylic resin binder is particularly preferred when the conductive material is a non-aqueous resin binder.

It is preferable that the mixing ratio of the binder resin to the positive electrode active material be in the range of 1 to 20%, more preferably in the range of 2 to 10%, and the most preferably in the range of 2 to 5%.

In the aspect of the invention, it is preferable that the thickness of one surface of the positive electrode active material layer be in the range of 50 to 175 μm, more preferably in the range of 60 to 125 μm, and the most preferably in the range of 70 to 100 μm. In addition, it is preferable that the total thickness of the positive electrode current collector, conductive layers and positive electrode active material layers be in the range of 110 to 360 μm, more preferably in the range of 130 to 260 μm, and most preferably in the range of 150 to 210 μm in the case of forming the conductive layers and the positive electrode layers on both sides of the positive electrode current collector.

Although the thickness of the positive electrode active material layer is designed in balance with that of the negative electrode active material layer in order to secure the energy density of the cell, if the thickness of the positive electrode active material layer decreases, the active material can be used effectively, and then the power density can be improved. When the thickness of the active material layer is too thin, the energy density decreases. Therefore, in the aspect of the invention, the thickness of the positive electrode active material layer can be determined properly in consideration of industrial productivity.

[D] Lithium Electrode

In the organic electrolyte capacitor according to the aspect of the invention, a lithium electrode 7 is disposed in the organic electrolyte capacitor previously as lithium ions supply source. The lithium electrode 'such as lithium metal or lithium-aluminum alloy' should contain lithium, and be capable of supplying lithium.

Amount of the lithium metal (lithium ions contained in the lithium electrode) disposed in the organic electrolyte capacitor should be enough to make the negative electrode obtain a predetermined capacitance. However, when the amount of the lithium has a larger amount of lithium ion than is required, the lithium electrode may remain in the organic electrolyte capacitor after a required amount of lithium ion is carried from the lithium electrode 7 (the definition of the capacitance will be described below). However, it is preferable that a required amount of lithium be disposed in the organic electrolyte capacitor, and all amount of lithium ion be carried to the negative electrode in order to guarantee the safety.

In the aspect of the invention, it is preferable that the lithium electrode be formed on the lithium electrode current collector made of a conductive porous body, however, the lithium electrode current collector does not have to be used. In this case, it is preferable that the conductive porous body made of the lithium electrode current collector be a metal porous body that does not react with lithium such as stainless steel mesh and the like.

When a conductive porous body such as stainless steel mesh and the like is used as the lithium electrode current collector, it is preferable that at least part of the lithium electrode be embedded into the porous portions of the lithium electrode current collector. It is more preferable that over 80% of the lithium electrode be filled into the porous portions of the conductive porous body. Then gaps that are induced between the electrodes by the loss of the lithium electrode decrease even when lithium ions are carried to the negative electrode, and thus the reliability of the organic electrolyte capacitor can be reliably improved.

It is preferable that the lithium electrode current collector having the lithium electrode thereon be disposed so as to face the positive or negative electrode. With the above arrangement, lithium ions can be carried smoothly to the negative electrode. It is possible to dispose the lithium electrode current collector having the lithium electrode thereon in the cross-sectional direction of the electrode-laminated unit, and to carry lithium ions to the negative electrode active material by short circuiting the negative terminal from the lithium electrode terminal. However, if the negative electrode is wide in this case, lithium ions cannot be carried uniformly to the electrode. Therefore, the position of lithium electrode must be determined properly in consideration of the structure of the cell, the size of the electrode and the like.

In the organic electrolyte capacitor according to the aspect of the invention, the freedom of cell design and the productivity of the organic electrolyte capacitor can be improved, and a superior charging and discharging characteristic can be obtained by disposing the lithium electrode that is carried to the negative electrode at specific positions locally.

[E] Electrolyte

The electrolyte used in the organic electrolyte capacitor according to the aspect of the invention should be capable of transferring lithium ion. The electrolyte is usually a liquid, and impregnated into the separators. A non electron-conductive porous body and the like having communicating holes, which have durability against the electrolyte, electrode active material and the like, can be used as the separator. In addition, gel-type or solid electrolyte can be used. In this case, it is not necessary to use the separator, and to worry about the leakage of electrolyte.

Lithium salt such as LiI, $LiClO_4$, $LiAsF_6$, $LiBF_4$, $LiPF_6$ and the like can be properly used as the electrolyte capable of transferring lithium ion since electrolysis does not occur even at high voltage and lithium ion can exist stably in the above substances. In this case, it is preferable that an aprotic organic solvent be used as the solvent that dissolves the electrolyte which is a lithium ion source.

This apriotic organic solvent includes, for example, ethylene carbonate, propylene carbonate, dimethylene carbonate, diethylene carbonate, γ-butyrolactone, acetonitrile, dimethoxyethane, tetrahydrofuran, dioxolane, methylene chloride, sulfonane or the like. Further, mixed solvents, in which two or more of these apriotic organic solvents are mixed, can be used.

The electrolyte and the solvent are mixed with each other after sufficient dehydration so as to be an electrolyte. Therefore, it is preferable that the concentration of the electrolyte in the electrolytic solution be at least over 0.1 mol/l, more preferably in the range of 0.5 to 1.5 mol/l in order to decrease the internal resistance by the electrolytic solution.

[F] Exterior Container

Though a material of the exterior container of the organic electrolyte capacitor according to the aspect of the invention is not limited specially, various materials that are generally used for batteries or capacitors can be used for the exterior container of the organic electrolyte capacitor, for example, metal materials such as iron, aluminum and the like, plastic materials, composite materials in which the above mentioned materials are laminated, and the like. In addition, though a shape of the exterior container is not limited, the exterior container can take various shapes such as cylindrical, rectangular and the like according to uses. It is preferable to use a film-type exterior container made of laminated films of aluminum and polymer such as nylon, polypropylene and the like in order to reduce the size and weight of the organic electrolyte capacitor.

As described above, three-layer laminated films, in which a nylon film is stuck to the outside of aluminum foil and modified polypropylene is stuck to the inside of the aluminum foil, are used as exterior materials of film batteries. Generally, the laminated films are deep-drawn in a predetermined size, and a unit formed with laminated or wound positive and negative electrodes and separators are put into the laminated films. After that, the electrolytic solution is injected into the laminated films, and then the laminated films are thermally bonded for sealing so as to form an electrical storage device. In this case, it is possible to project the positive terminal (for example, about 100 μm-thick aluminum foil) and the negative terminal (for example, about 100 μm-thick nickel foil) to the outside of the cell between the laminated films. That is, the laminated films can be sealed easily by thermal bonding with the positive and negative terminals therebetween. In addition, it is preferable that the above-mentioned thin metal foils be used as the terminals, and sealant films be stuck on the surfaces of the terminals previously in order to seal the laminated films tightly.

In FIG. 1, the laminated films 4 and 5 are used as the exterior container, and the only laminated film 5 is deep-drawn enough to cover the three-electrode-laminated unit. However, any one of the laminated films 4 and 5 can be deep-drawn, and both laminated films 4 and 5 can be deep-drawn too. In FIG. 1, two laminated films form a set, and the laminated films are overlapped to cover contents. Also, the outer circumferential portions of the overlapped films are heat-sealed to seal the contents.

In the aspect of the invention, the shape of the films is not limited to a sheet shape, and cylindrical or pouch-shaped film members can also be used. When cylindrical films are used, the facing two sides are heat-sealed to seal the contents, and when pouch-shaped film members are used, the open side is heat-sealed to seal the contents.

[G] Principles of the Organic Electrolyte Capacitor According to the Invention

Generally, almost the same amount of active material (mainly activated carbon) is used for positive and negative electrodes in a conventional electric double-layer capacitor. The active material used for the positive and negative electrodes has about 3 V by $Li/Li^+$ electrode potential when a cell is assembled, anion form electric double-layer on a surface of the positive electrode by charging the cell so as to increase the electric potential of the positive electrode. ON the other hand, cations form electric double-layer on a surface of the negative electrode by charging the cell so as to decrease the electric potential. Contrary to the above when the cell is discharged, anions are released from the positive electrode to an electrolytic solution so as to decrease the electric potential, and cation are released from the negative electrode to the electrolytic solution so as to increase the electric potential, whereby the electric potential returns to about 3 V. That is, the charging and discharging curves of the positive and negative electrodes are almost asymmetric to each other with 3 V-line, and the variation of electrode potential of the positive electrode is almost equal to that of the negative electrode. In addition, almost only anions enter and are released from the positive electrode, and almost any cations enter and are released from the negative electrode.

Meanwhile, it is preferable to use an active material capable of carrying lithium ion and/or anion reversibly, for the positive electrode in the organic electrolyte capacitor according to the aspect of the invention. The above active material includes activated carbon, which is used for the positive and negative electrodes of the conventional electric double-layer capacitor. In addition, it is preferable to use an active material capable of carrying lithium ion reversibly to the negative electrode, to make the capacitance per unit weight of the negative electrode active material over three times larger than that of the positive electrode active material by controlling the carrying amount of lithium ion to the negative electrode active material, and to make the weight of the positive electrode active material larger than that of the negative electrode active material.

In the invention, the capacitance and capacity are defined as follows. The capacitance of the cell represents the gradient of the discharging curve of the cell, and a unit therefore is F (farad). The capacitance per unit neither of the cell represents the capacitance of the cell divided by the total weights of the positive and negative electrode active materials that fill the cell, and a unit thereof is F/g. The capacitance of the positive electrode represents the gradient of the discharging curve of the positive electrode, and a unit thereof is F. The capacitance per unit weight of the positive electrode represents the capacitance of the positive electrode divided by the weight of the positive electrode active material that fills the cell, and a unit thereof is F/g. The capacitance of the negative electrode represents the gradient of the discharging curve of the negative electrode, and a unit thereof is F. The capacitance per unit weight of the negative electrode represents the capacitance of the negative electrode divided by the weight of the negative electrode active material that fills the cell, and a unit thereof is F/g.

In addition, the capacity of the cell is the product of the difference between the voltages when the discharging of the cell begins and is finished, that is, the variations of voltage 'the capacitance of the cell. Although the unit of the capacity is C(coulomb)' since 1 C is the amount of electric charges when 1 A of electric current flows for one second, C is converted into mAh in the invention. The capacity of the positive electrode represents the product of the difference of the electrode potentials of the positive electrode when discharging begins and is finished (the variation of electrode potential of the positive electrode) and the capacitance of the positive electrode, and a unit thereof is C or mAh. Similarly, the capacity of the negative electrode represents the product of the difference of the electrode potentials of the negative electrode when discharging begins and is finished (the variation of electrode potential of the negative electrode) multiplied by the capacitance of the negative electrode, and a unit thereof is C or mAh. The capacities of the cell, positive and negative electrodes have the same values.

In this case, if the capacitance per unit weight of the negative electrode active material is less than three times of that of the positive electrode active material, the capacity increases mere slightly compared with a capacity when almost the same amount of active material is used for the positive and negative electrodes.

Also, if the capacitance per unit weight of the negative electrode active material is more than three times of that of the positive electrode active material, the capacity increases mere slightly compared with a capacity when the weight of the positive electrode active material is smaller than that of the negative electrode active material and almost the same amount of active material is used for the positive and negative electrodes.

In the organic electrolyte capacitor according to the aspect of the invention, the electrode potential of the negative electrode is lower than 3 V compared with that of the positive electrode at about 3 V when a given amount of lithium ions is carried to the negative electrode previously in order to obtain the capacity required for the capacity of the negative electrode.

How high the charging voltage of the capacitor is made is generally determined by the electrode potential of the positive electrode. That is, the electrolytic solution is decomposed by oxidation at a high electrode potential of the positive electrode, whereby that becomes the demarcation potential. Comparing with a capacitor having a conventional cell structure, the electrode potential of the negative electrode can be lowered than that of the negative electrode in the capacitor according to the aspect of the invention, which carries lithium ions previously, whereby the larger electrode potential difference between the positive and negative electrodes can be obtained. Therefore, it is possible to have a withstand voltage of over 3 V and about 3.6 to 4.1 V with the structure of the aspect of the invention, and thus the energy density can be improved comparing with a conventional electrode double-layer capacitor having the withstand voltage of about 2.3 to 2.7 V.

In addition, it is possible to increase the capacity of the positive electrode by a lower electrode potential of the negative electrode. That is, it is possible to increase the variation of the electrode potential of the positive electrode is discharged, since the electric potential of the negative electrode is lower than 3V at the end of discharging.

Specifically, it is possible to have an electrode potential of the positive electrode below 3 V, for example, to lower the electrode potential down to 2 V, at the end of the discharging (In this case, the positive electrode potential decreases due to the release of anions downs to 3 V and the doping of the lithium ions below 3 V).

In a conventional electric double-layer capacitor, the electrode potential of the positive electrode is not lowered to about 3 V when the capacitor is discharged. It is because the electrode potential of the negative electrode also becomes 3 V at this times and the voltage of the cell becomes 0 V. That is, since the electric potential of the positive electrode can be lowered to 2 V, the structure of the aspect of the invention can obtain higher capacity than the structure of the conventional electric double-layer capacitor in which the electric potential of the positive electrode cannot be lowered to 3 V.

[H] Specific Examples of the Internal Structure

Hereinafter, the internal structure of the organic electrolyte capacitor according to the aspect of the invention will be described with specific examples.

First Embodiment

FIG. 1 is a perspective view of a film-type capacitor according to the first embodiment of the organic electrolyte capacitor of the invention. FIG. 2 is a plan view of the first embodiment, FIG. 3 is a cross-sectional view taken along the line I-I' shown in FIG. 2, and FIG. 4 is a cross-sectional view taken along the line II-II' shown in FIG. 2.

In the first embodiment, a three-electrode-laminated unit 8 is formed by providing a lithium electrode 7 on an electrode-laminated unit 6, in which electrode pairs including positive and negative electrodes are laminated sequentially.

In the first embodiment, the electrode-laminated unit 6 is formed using three negative electrode current collectors 2a and two positive electrode current collectors 1a. The positive and negative electrode current collectors 1a and 2a have holes penetrating the front and rear surfaces, and at least part of the through-holes are blocked with conductive materials 1b and 2b that are different from those of positive and negative active material layers 1 and 2. The positive and negative material layers 1 and 2 are formed on the positive and negative electrode current collectors 1a and 2a that have the through-holes blocked with the conductive materials 1b and 2b.

In the electrode-laminated unit 6, separators 3 are interposed between the positive and negative electrodes in order to prevent direct contact of the positive and negative electrodes, and the first negative electrode current collector 2a having the negative electrode active material layer 2 on the upper surface thereof, the first positive electrode current collector 1a having the positive electrode active material layers 1 on both surfaces thereof, the second negative electrode current collector 2a having the negative electrode active material layers 2 on both surfaces thereof, the second positive electrode current collector 1a having the positive electrode active material layers 1 on both surfaces thereof, and the third negative electrode current collector 2a having the negative electrode active material layer 2 on the lower surface thereof are sequentially laminated from the lowest layer in this order. In addition, a lithium electrode current collector 7a having the lithium electrode 7 on the lower-surface thereof is disposed on the electrode-laminated unit 6 with the separator 3 interposed therebetween thereby forming a three-electrode-laminated unit 8.

In FIG. 1, each of the positive electrode current collectors 1a has an extended portion, which becomes a terminal connecting portion A', and is welded to a positive terminal 1b at the terminal connecting portion A'. In addition, each of the negative electrode current collectors 2a and the lithium electrode current collector 7a have extended portions, which become terminal connecting portions B', and are welded to a negative terminal 2b at the terminal connecting portion B'. The shape of the extended portion, which becomes the terminal connecting portion, is not limited. It is convenient and preferable that several extended portions of the positive electrode current collectors (or the negative current electrode collectors) be tied with each other and welded by ultrasonic welding and the like. Although the positive terminal 1b is disposed at the opposite side of the negative terminal 2b in the first embodiment, there is not limitation on the positions of the terminals, for example, the positive terminal 1bmay be disposed at the same side of the negative terminal 2b. When the laminated films have the same size, it is preferable that the positive and negative terminals 1b and 2b, and the lithium electrode terminal 7b be disposed at the same side, since the sizes of the electrodes can be increased and thus the capacity can be increased.

In the first embodiment, the electrode-laminated unit 6 includes four electrode-pairs, each of the electrode-pairs having a positive electrode and a negative electrode. The number of electrode-pairs in the electrode-laminated unit 6 is not limited thereto, and the electrode-laminated unit 6 may have only one or two electrode pairs. Also, the electrode-laminated unit 6 having over two electrode-pairs may be formed by winding the electrode-pairs consisted of the positive and negative electrodes.

In addition, it is not necessary to provide the positive and negative electrodes as a pair indispensably if the electrode-laminated unit 6 includes at least a layer of the positive and negative electrodes. For example, it is possible to provide one common positive electrode to over two negative electrodes.

Further, although the three-electrode-laminated unit 8 has the lithium electrode 7 on the upper surface of the electrode-laminated unit 6 in the first embodiment, the position of the lithium electrode 7 is not limited thereto. That is, the lithium electrode 7 may be provided on the lowest layer or the intermediate layer of the electrode-laminated unit or two lithium electrodes 7 may be provided on the uppermost and lowest layers, respectively. For example, the three-electrode-laminated unit 8 may have another layer structures shown in FIGS. 10 to 12 instead of the layer structure of the first embodiment.

Figure 10:
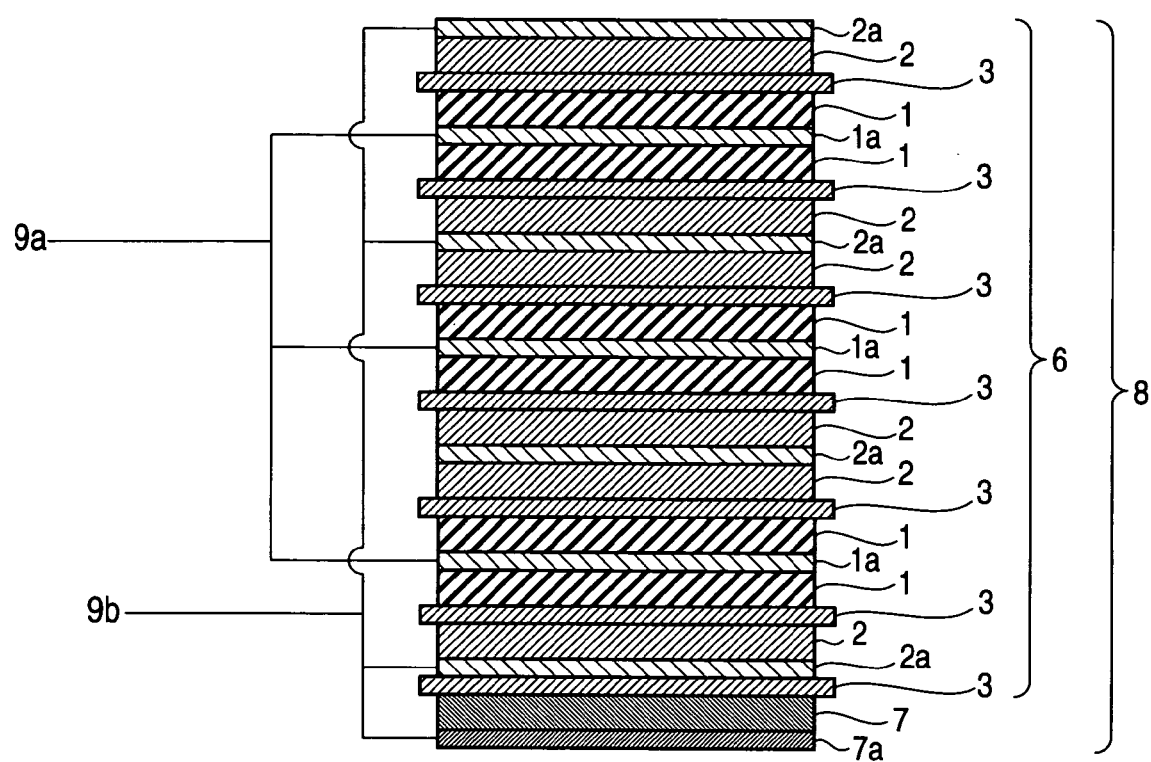
FIG. 10 is a cross-sectional view showing a first example of layer structure of three-electrode-laminated unit.

FIG. 10 shows another layer structure of the three-electrode-laminated unit 8. As shown in FIG. 10, the lithium electrode 7 having a lithium metal pressed on the lithium electrode current collector 7a is disposed on the lower side of the electrode-laminated unit 6, in which the positive electrodes (1+1a), the separators 3 and the negative electrodes (2+2a) are sequentially laminated, whereby the three-electrode-laminated unit 8 is formed.

Figure 11:
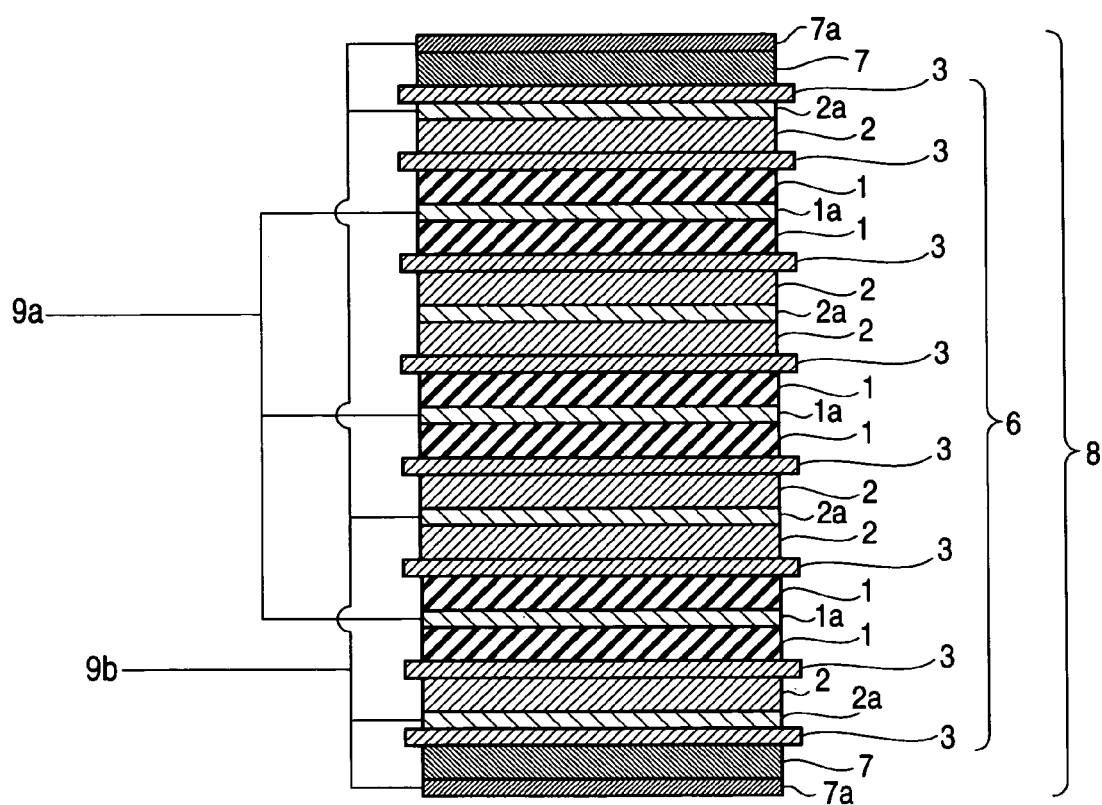
FIG. 11 is a cross-sectional view showing a second example of layer structure of three-electrode-laminated unit.

FIG. 11 shows still another layer structure of the three-electrode-laminated unit 8. As shown in FIG. 11, the three-electrode-laminated unit 8 includes the lithium electrodes that have lithium metals pressed on the lithium electrode current collectors 7a arm are disposed on the upper and lower sides of the electrode-laminated unit 6.

Figure 12:
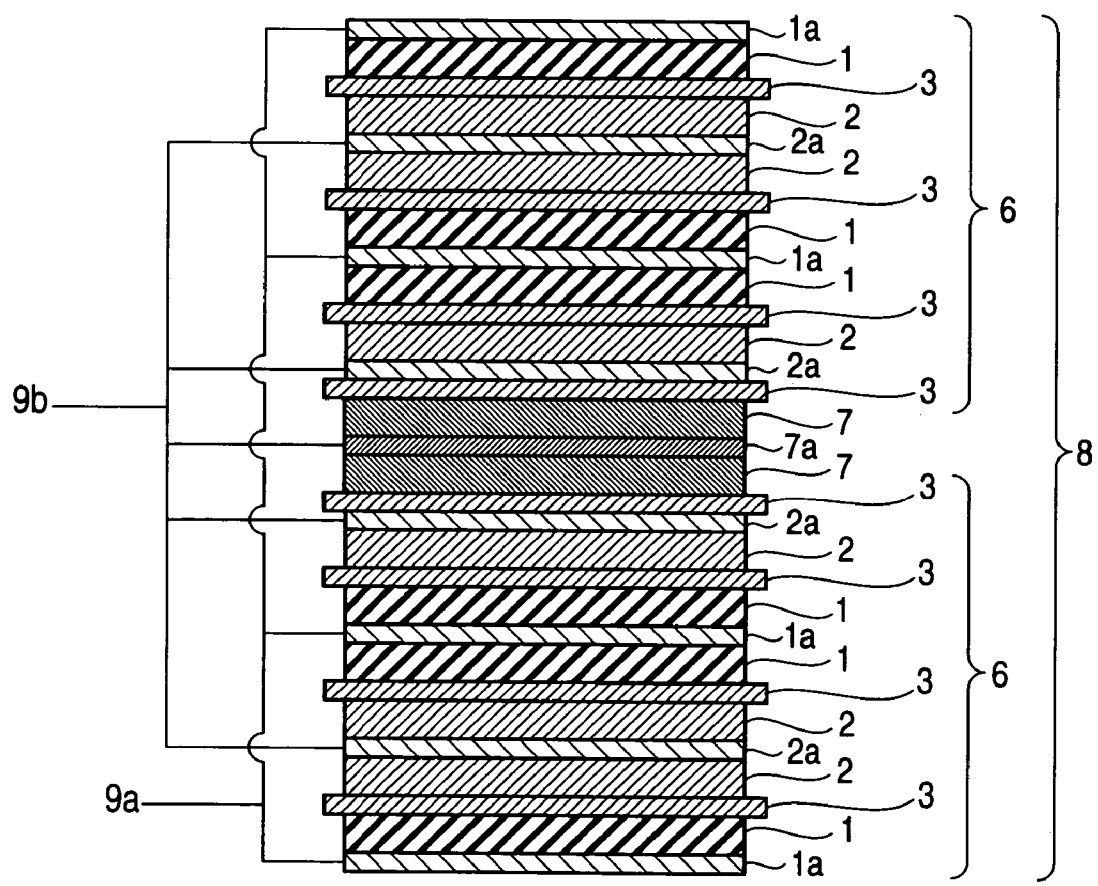
FIG. 12 is a cross-sectional view showing a third example of layer structure of three-electrode-laminated unit.

Further, an example shown in FIG. 12 is a three-electrode-laminated unit 8 in which the lithium electrode 7 is disposed between two electrode-laminated units 6.

As described above, it is possible to properly chance the position of the lithium electrode 7 in a laminated electrode arrangement.

Several positive electrodes 1 laminated in the three-electrode-laminated unit 8 shown in FIGS. 10 to 12 are tied with one another and, connected to a wiring line 9a. In addition, several negative electrodes 2 and the lithium electrode 7 laminated in the three-electrode-laminated unit 8 are tied with one another and connected to a wiring line 9b. The wiring lines 9a and 9b are, for example, the positive and negative terminals 1c and 2c when each electrode is connected with the wiring, it is convenient and preferable that part of the electrode current collectors of the electrodes are tied with one another and welded by ultrasonic welding and the like.

Second Embodiment

Figure 13:
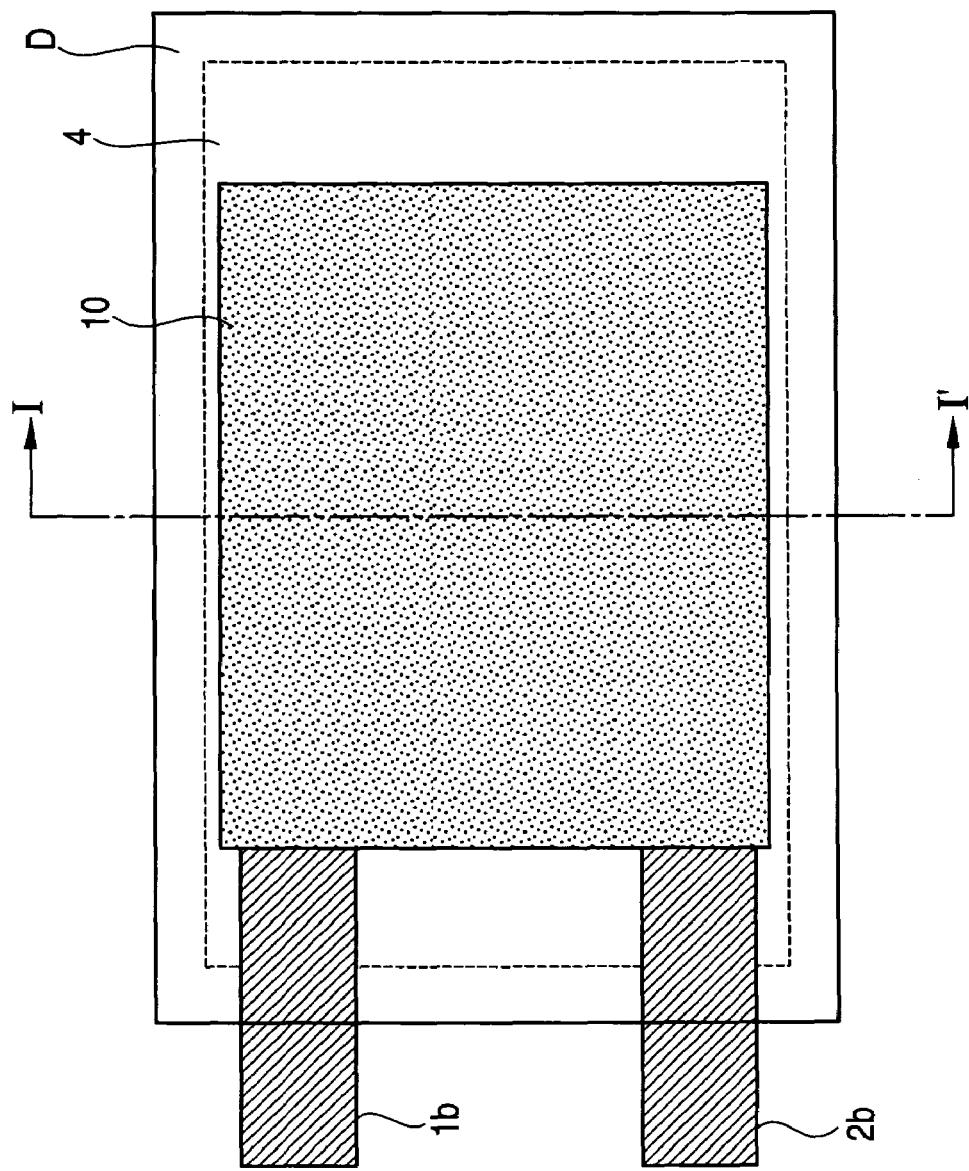
FIG. 13 is a plan view showing a second embodiment.
Figure 14:
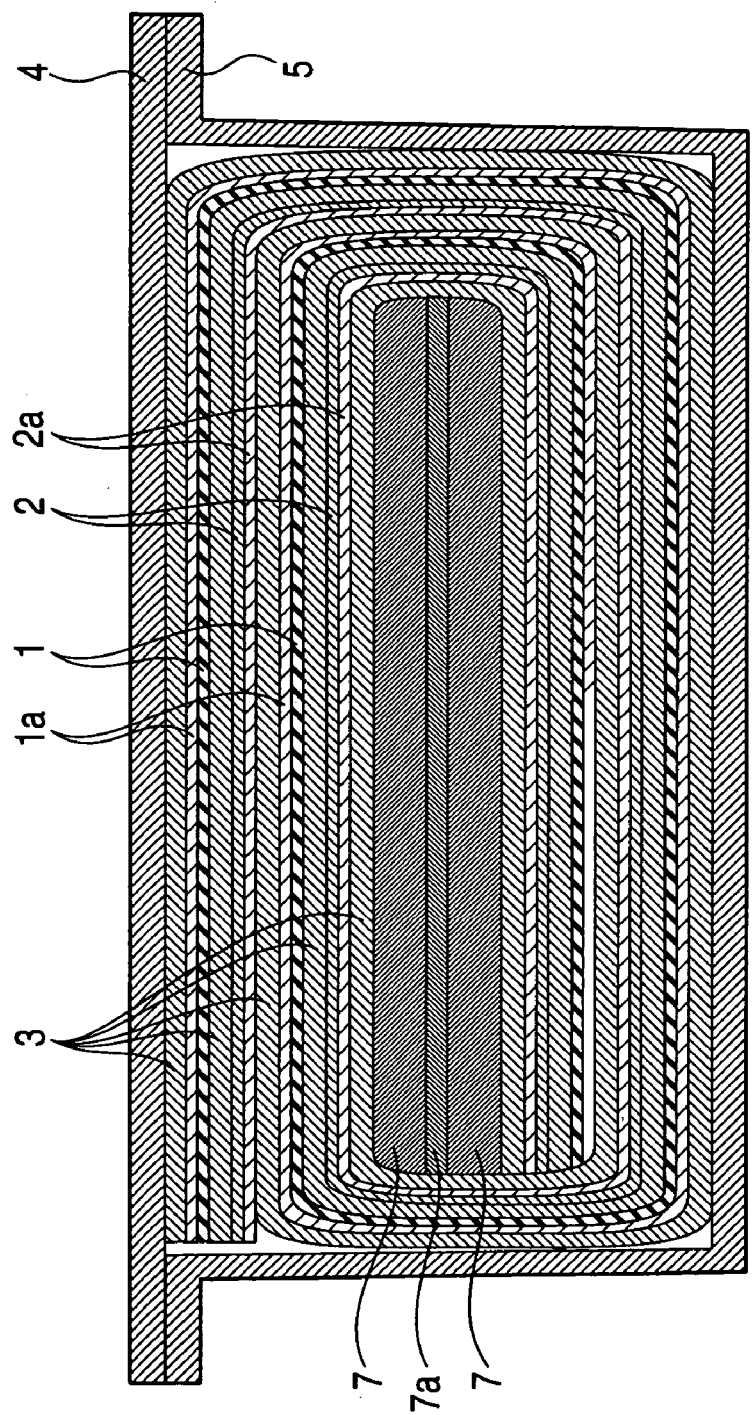
FIG. 14 is a cross-sectional view taken along I-I' shown in FIG. 13.

Hereinafter, the second embodiment will be described. FIG. 13 is a plan view showing the second embodiment. FIG. 14 is a cross-sectional view taken along the line I-I' shown in FIG. 13. Since the same numerals in the first and second embodiments denote the same components, only different portions will be described in detail.

As shown in FIG. 14, the sheet-shaped lithium electrodes 7 are disposed in the center of the roll-type structure in the second embodiment. The lithium electrodes 7 are formed on both surfaces of the lithium electrode current collector 7a. The positive electrode 1 is formed on a surface of a ribbon-shaped positive electrode current collector 1a, and the negative electrode 2 is formed on a surface of a ribbon-shaped negative electrode current collector 2a. Separator 3, negative electrode (2+2a), separator 3, and positive electrode (1+1a) are overlapped in this order and wound elliptically with the lithium electrode current collector 7a having the lithium electrodes 7 on both surfaces as a winding core, and then pressed.

Figure 15:
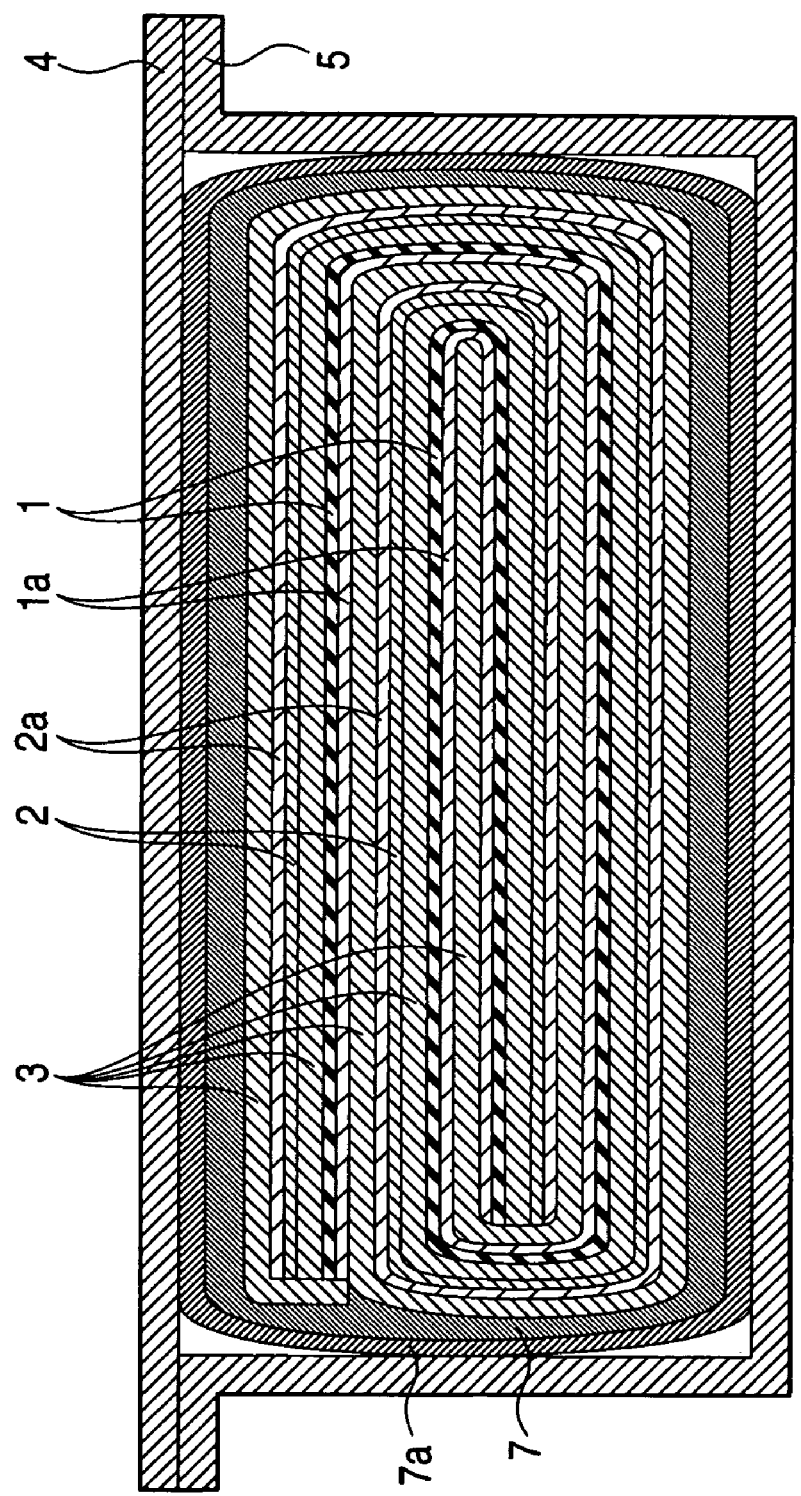
FIG. 15 is a cross-sectional view of a capacitor having a roll-type structure, in which a lithium electrode 7 is disposed at the outermost circumference.

Although the sheet-shaped lithium electrodes 7 are disposed in the center in the second embodiment, the position and shape of the lithium electrodes 7 are not limited thereto. For example, the lithium electrode 7 may be disposed at the outermost circumference of the roll-type structure as shown in FIG. 15.

[I] Manufacturing Method of the Organic Electrolyte Capacitor

Hereinafter, an example of the manufacturing method of the organic electrolyte capacitor according to the aspect of the invention will be described. First, through-holes of electrode current collectors are blocked with conductive materials in order to manufacture an electrode substrate. Although there is to limitation on a blocking method of the through-holes in the electrode current collectors with the conductive materials, it is possible to use well-known methods of coating such as die method, dipping method, spray method and the like or printing such as gravure, screen, transfer and the like. In this case, it is preferable that over 80% of the holes in the electrode current collectors by the area be blocked.

Then, positive and negative electrode active material layers are formed on the electrode substrate, in which the through-holes of the electrode current collectors are blocked with the conductive materials. The positive electrode active material layer is formed by coating and drying a slurry-type positive electrode material which is a mixture of positive electrode active material and binder resin, on the electrode substrate for the positive electrode. Similarly, the negative electrode active material layer is formed by coating and drying a slurry-type negative electrode material, which is a mixture of negative electrode active material and binder resin, on the electrode substrate for the negative electrode.

The lithium electrode is formed by pressing lithium metal on a lithium electrode current collector that is made of a conductive and porous body. The thickness of the lithium electrode current collector is in the range of about 10 to 200 µm, and that of the lithium electrode is in the range of 50 to 300 µm.

The electrode current collectors having electrodes are cut to have suitable widths for the size of the exterior container of the organic electrolyte capacitor after drying. When a roll-type structure of the electrode-laminated unit is manufactured, the electrode current collectors are cut into ribbon shapes. In this case, it is possible to out the electrode current collector into a shape having an extended portion as a terminal welding portion.

Figure 16:
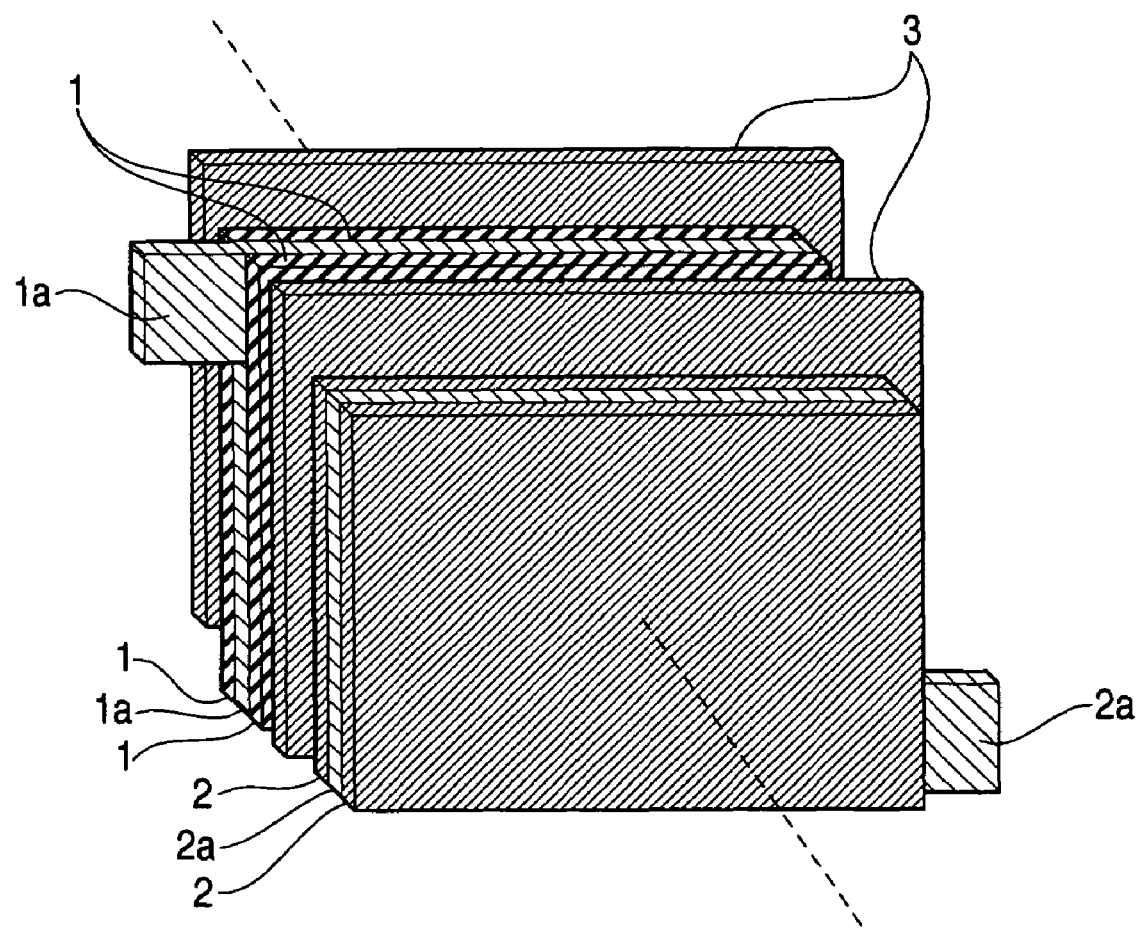
FIG. 16 is a perspective view showing an example of disassembled electrode-laminated unit.
Figure 17:
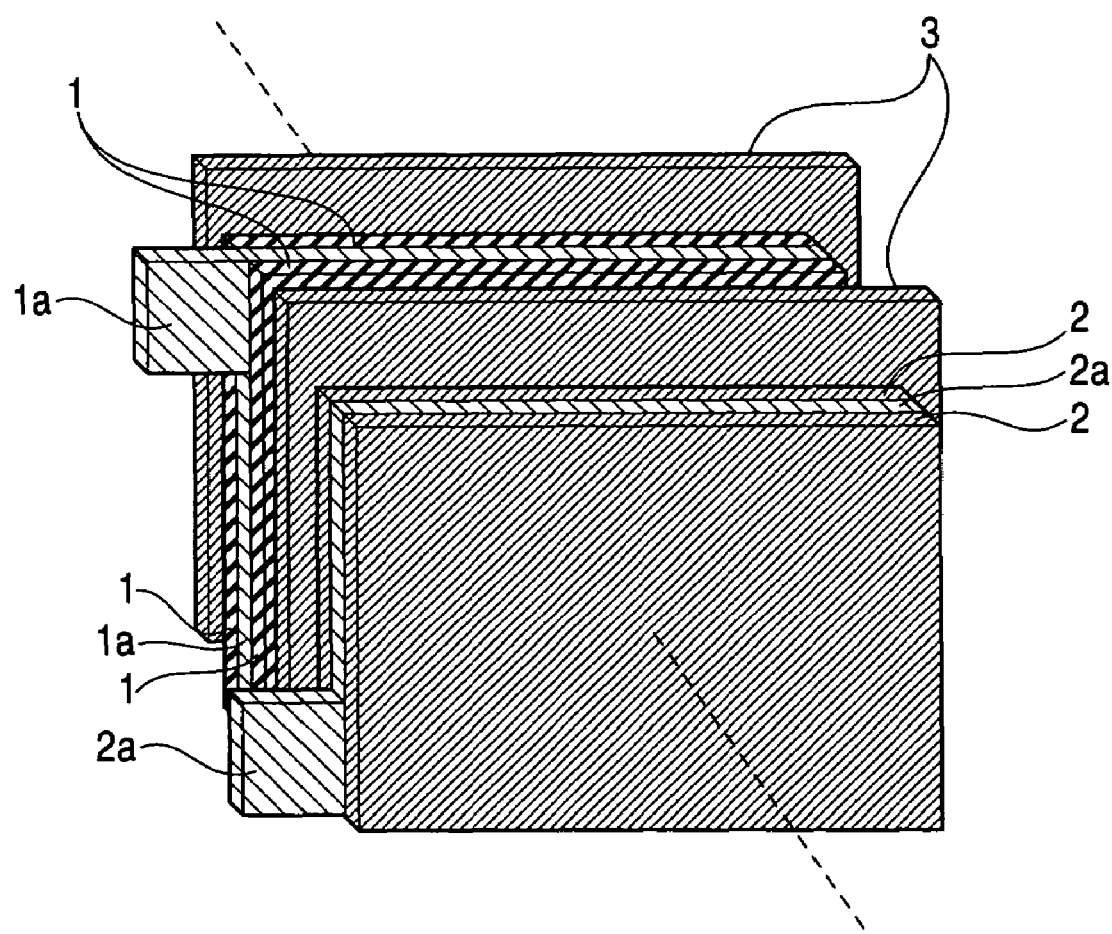
FIG. 17 is a perspective view showing an example of disassembled electrode-laminated unit.

Then, the electrode current collectors having the electrodes are assembled to form a three-electrode-laminated unit while separators are interposed therebetween in order to prevent direct contact between the positive and negative electrodes. FIGS. 16 and 17 are perspective views of decomposed electrode-laminated units, and show the shapes and laminating directions of the terminal welding portions. FIG. 16 shows an example, in which the terminal welding portion of the positive electrode is disposed at the opposite side of that of the negative electrode, and FIG. 17 shows an example, in which the terminal welding portions of the positive and negative electrodes are disposed at the same side. However, the direction of the terminals of the positive and negative electrodes are not limited to the above two types.

The terminal welding portion of the positive electrode current collector of the assembled three-electrode-laminated unit is welded to the positive terminal by ultrasonic welding and the like, and the terminal welding portions of the negative electrode current or and the lithium electrode current collector are welded to the negative terminal by ultrasonic welding and the like.

The three-electrode-laminated unit that is welded to the external terminals is installed in an exterior container, and then the exterior container is sealed by thermal bonding and the like excluding an electrolyte injecting hole. In this case, at least part of the external terminals project from the exterior container in order to connect with external circuits. The electrolyte is injected through the electrolyte injecting hole of the exterior container, and then the electrolyte injecting hole is sealed by thermal bonding and the like after the exterior container is filled with the electrolyte. Then, the exterior container is completely sealed, whereby the organic electrolyte capacitor according to the aspect of the invention can be obtained.

When an electrolytic solution is injected, every negative electrode is in electrochemical contact with the lithium electrodes, and lithium ion in the electrolytic solution eluted from the lithium electrode move to the negative electrode to be carried to the negative electrode as time goes by. When the lithium ions are carried to the negative electrode, the negative electrode is distorted due to skewness occurred by the intrusion of the lithium ions to the negative electrode.

Thus, it is preferable to fix the negative electrodes with external force to maintain the shape of the negative electrodes.

Specially, in the case of the film-type capacitor, since the contacting pressure from the exterior container is weaker than that of a battery using a metal case such as cylindrical or rectangular battery, it is preferable to apply external force to maintain the shapes of the positive and negative electrodes. Thus the distortion of the cell can be prevented, and the performance of the cell can be improved.

So far, the organic electrolyte capacitor according to the aspect of the invention has been described. The organic electrolyte capacitor according to the aspect of the invention has the same structure as that of a storage device according to the aspect of the invention (for example, secondary battery and the like) in that electrodes having the positive and negative electrode active material layers on the electrode substrate are used as the positive and negative electrodes and the electrode substrate has conductive layers made of the conductive materials on the electrode current collectors having the through-holes that penetrate the front and rear surfaces. Therefore, it is possible to apply the above description to the storage device according to the aspect of the invention [except for [G]].

BEST MODE FOR CARRYING OUT THE INVENTION

Hereinafter the aspect of the invention will be described in detail with reference to examples. However, the invention is not limited to the examples.

First Example

Manufacturing Method of PAS Slurry for the Negative Electrode

PAS is synthesized by thermally treating a 0.5 mm-thick phenolic resin plate in a siliconit electric furnace, which increases the temperature up to 500° C. at a speed of 50° C./hour, and then up to 650° C. at a speed of 10° C./hour under nitrogen atmosphere. The PAS plate obtained in this way is grinded up by a ball mill so as to obtain PAS powder having an average particle size of 7 μm. The H/C ratio of the PAS powder is 0.22.

Next, 92 parts by weight of the above-mentioned PAS powder, 4 parts by weight of acetylene black powder, 4 parts by weight of SBR, 3.2 parts by weight of carboxymethylcellulose, and 120 parts by weight of ion-exchanged water are mixed sufficiently to obtain a slurry.

Measurement of the Capacitance Per Unit Weight of the Negative Electrode

The slurry is coated and dried on a surface of an 18 μm, thick copper foil, and then pressed so as to form a PAS negative electrode, the solid amount of the slurry is about 7 mg/cm². The negative electrode is cut into 1.5×2.0 cm²-size electrodes to obtain sample negative electrodes. A 1.5×2.0 cm²-size and 200 μm-thick metal lithium layer as an opposite electrode to the negative electrode is laminated on a negative electrode with a 50 μm-thick polyethylene non-woven fabric layer interposed therebetween as a separator so as to assemble a sample cell. A metal lithium layer is used as a reference electrode. A solution in which 1 mol/l solution of $LiPF_6$ is dissolved in propylene carbonate is used as an electrolytic solution.

The negative electrode is charged with 400 mAh/g of lithium ions per unit weight of the negative electrode active material at a charging current of 1 mA, and then is discharged as 1 mA until the voltage becomes 1.5 V. The capacitance per unit weight of the negative electrode is 652 F/g, which is estimated from the discharging time, that is, the time required for the electrode potential to change as much as 0.2 V from the negative electrode at one minute later from the beginning of the discharging.

Manufacturing Method of Active Carbon Slurry for the Positive Electrode

Palm husk is heated up to 950° C. at a speed of 50° C./hour under nitrogen atmosphere in an electric furnace, and then activated by a mixed gas of nitrogen/water vapor in which the same amounts of both are contained, for two hours so as to obtain activated carbon having a specific surface area of 1860 m²/g. The activated carbon is grinded by a ball mill so as to obtain activated carbon powder having arm average particle size of 5 μm.

93 parts by weight of the activated carbon powder, 4 parts by weight of acetylene black, 4 parts by weight of SBR, 1 part by weight of carboxymethylcellulose, and 150 parts by weight of ion-exchanged water are mixed sufficiently to obtain slurry.

Measurement of the Capacitance Per Unit Weight of the Positive Electrode

The slurry is coated and dried on a surface of a 20 μm-thick aluminum foil that has been coated with a carbon-based conductive material, and then pressed so as to obtain a positive electrode, the solid amount of the slurry is about 7 mg/cm². The positive electrode is cut into three 1.5×2.0 cm²-size electrodes, one electrode is used as the positive electrode, and the other electrodes are used as the negative and reference electrodes. The positive and negative electrodes are laminated with a 50 μm-thick paper non-woven fabric layer interposed therebetween as a separator so as to obtain a sample cell of the capacitor. A solution in which 1 mol/l solution of triethylmethylammonium tetrafluoroborate [TEMA.BF$^4$] is dissolved in propylenecarbonate is used as an electrolytic solution.

The cell is charged at a charging current of 10 mA until the voltage becomes 2.5 V, and then charged at the constant voltage. After one hour of charging, the cell is discharged at 1 mA until the voltage becomes 0 V. The capacitance per unit weight of the cell estimated from the discharging time while the voltage is decreases from 2.0 to 1.5 V is 22 F/g. Also, the capacitance per unit weight of the positive electrode estimated similarly from the potential difference between the reference and positive electrodes is 88 F/g.

Manufacturing Method of the Negative Electrode

Both surfaces of 25, 32, 36 μm-thick (these haste porosities of 50%) copper expanded metals (manufactured by Nippon Metal Industry Co., Ltd.) are coated with a non-aqueous carbon-based conductive paint (manufactured by Acheson (Japan) Limited: ED-815) by the spray method, and then dried so as to obtain electrode substrates for the negative electrodes having conductive layers. The total thicknesses (the sum of the thickness of the negative electrode current collector and that of the conductive layer) are 35, 42, 48 μm respectively, and almost all through-holes are blocked with a conductive material, whereby the blocking ratio reaches up to 98%. The above slurry for the negative electrode is coated on both surfaces of the electrode substrates for the negative electrodes by the die method. The thickness of the negative electrode active material layers is 575 μm on one surface. The electrode is then pressed. Then positive electrodes 1, 2 and 3, which have total thickness (the sum of the thickness of the negative electrode active material layers on both surfaces, those of the conductive layers on both surfaces and that of the negative electrode current collectors) of 150, 157 and 163 μm, are obtained.

Manufacturing Method of Positive Electrode

Both surfaces of a 35 μm-thick (porosity of 50%) aluminum expanded metals (manufactured by Nippon Metal Industry Co., Ltd.) are coated with a non-aqueous carbon-based conductive paint (manufactured by Acheson (Japan) limited: EB-815) by the spray method, and then dried so as to obtain an electrode substrate for the positive electrode having conductive layers. The total thickness (the sum of the thickness of the positive electrode current collector and that of the conductive layer) is 45 μm, and almost all through holes are blocked with the conductive materials. The above slurry for the positive electrode is coated on both surfaces of the electrode substrate for the positive electrode by the die method. The thickness of the positive electrode active material layer is 142.5 μm on a single surface. The electrode is then pressed. Then positive electrode 1, the total thickness (the sum of the thickness of the positive electrode active material layers on both surfaces, those of the conductive layer on both surfaces, and that of the positive electrode current collector) of which is 330 μm, is obtained.

Preparation of a Cell

Each of the 150 μm-thick negative electrode 1, 157 μm-thick negative electrode 2, and 163 μm-thick negative electrode 3, and 330 μm-thick positive electrode 1 are cut into 5.0×7.0 cm²-size electrodes having the shapes of FIG. 16, and 25 μm-thick cellulose/rayon mixed non-woven fabric layers are used as the separators. Welding portions between the positive electrode current collector and the connecting terminal (hereinafter referred to as 'connecting terminal welding portion') is disposed at the opposite side of the connecting terminal welding portion of the negative electrode current collector as shown in FIG. 16, and the electrodes and separators are laminated The thickness of the cell is 10 mm, and the numbers of layers for the positive and negative electrodes are seventeen.

The separators are disposed at the upper most and lowest portion, and the four sides are fixed with tapes, whereby an electrode-laminated unit is obtained. The weight of the positive electrode active material is 1.65 times larger than that of the negative electrode active material. Lithium metal foils (190 μm, 5.0×7.0 cm²) pressed onto 80 μm-thick stainless steel nets are used as the lithium metals, and disposed at the upper and lower surfaces of the electrode-laminated unit to face the negative electrodes. The stainless steel nets, on which the (seventeen) negative electrodes and the lithium electrode are pressed, are welded to one another so as to be in contact with one another, whereby an electrode-laminated unit is obtained.

A 10 mm-wide, 30 mm-long and 0.2 mm-thick aluminum positive terminal having a sealant film thermally bonded at the sealing portion previously is overlapped and ultrasonic-welded to the (seventeen) terminal welding portions of the positive electrode current collector of the electrode-laminated unit. Similarly, a 10 mm-wide, 30 mm-long and 0.2 mm-thick nickel negative terminal having a sealant film thermally bonded at the sealing portion previously is overlapped and ultrasonic-welded to the (seventeen) terminal welding portions of the negative electrode current collector, and installed in two exterior films that are drawn as deep as 5 mm (having a space of total 10 mm). After two sides, in which the terminals exist, and the other one side of the exterior laminated films are thermally bonded, a 1 mol/l solution of LiPF$^6$ dissolved in a mixed solvent in which ethylene carbonate, diethyl carbonate and propylene carbonate are mixed by weight ratio of 3:4:1, is impregnated into the capacitor under vacuum as the electrolytic solution, and then the remaining side is thermally bonded under reduced pressure so as to be sealed under vacuum. Therefore, two cells of the film-type capacitors are assembled.

Characteristic Evaluation of the Cell

After 14-days exposure to the room temperature, one of the two cells is disassembled. The result is that lithium ions are preliminary charged in order to obtain the capacitance per unit weight of the negative electrode active material of over 650 F/g from the fact that the lithium metal is completely removed. The ratio of the capacitance per unit weight of the negative electrode active material to that of the positive electrode active material is 7.41.

In addition, the remaining cell is charged by a constant current-constant voltage charging in which a cell is charged at a constant current of 4000 mA until the voltage of the cell becomes 3.6V and then at the constant of 3.6V continues to supply voltage for one hour. After that, the cells are discharged at a constant current of 400 mA until the voltage of the cells become 1.6 V. Table 1 shows the capacity and the energy density of the cells when the cells are discharged from the third time after repeating the 3.6 to 16 V cycles.

TABLE 1

| First example | Thickness of cell (mm) | Internal resistance (mΩ) | Capacity of cell (mAh) | Energy density (Wh/l) |
|---|---|---|---|---|
| Negative electrode 1 | 9.9 | 4.53 | 410.9 | 19.4 |
| Negative electrode 2 | 10.1 | 4.57 | 409.3 | 19.1 |
| Negative electrode 3 | 10.2 | 4.58 | 408.8 | 19.0 |

Second Example

The positive electrodes 2 to 4 and the negative electrode 4 are manufactured, and two cells of film-type capacitors for each of the collectors of the positive electrode are assembled in the same manner as that of the first example except that 50, 60, and 80 μm-thick (these have porosities of 50%) aluminum expanded metals (manufactured by Nippon Metal Industry Co., Ltd.) are used for the positive electrode current collector, and a 50 μm-thick (porosity of 50%) copper expanded metal (manufactured by Nippon Metal Industry Co., Ltd.) is used for the negative electrode current collector. Since the thickness of the positive electrode active material layer on a single surface is 142.5 μm, the total thicknesses of the positive electrodes are 345 μm for positive electrode 2. 355 μm for positive electrode 3, and 375 μm for positive electrode 4 [10 μm-thick conductive layer is formed on every expanded metal].

In addition, since the thickness of the negative electrode active material layer on a single surface of negative electrode 4 is 57.5 μm, the total thickness is 175 μm (10 μm-thick conductive layer is formed). When the positive and negative electrodes are laminated until the thickness of the cell becomes 10 mm, the numbers of electrodes are sixteen for cells using positive electrodes 2 and 3, and fifteen fox a cell using positive electrode 4. Also, lithium, metal foils (180 μm, 5.0×7.0 cm$^2$) pressed onto a 80 μm-thick stainless steel net are used as the lithium metal fox cells having sixteen electrodes, lithium metal foils (170 μm, 5.0×7.0 cm$^2$) pressed onto an no 80 μm-thick stainless steel net are used as the lithium metal for cells having fifteen electrodes, and lithium, metal foils are disposed at the upper and lower surfaces of the electrode-laminated unit in order to face the negative electrode. Active material of positive electrode is 1.65 times larger than that of the negative electrode.

Characteristic Evaluation of the Cell

After 14-days exposure to the room temperature, one of two cells for each type capacitor each cell is disassembled. It is turned out that lithium ions are preliminary charged in order to obtain the capacitance per unit weight of the negative electrode active material of over 650 F/g from the fact that the lithium metal is completely removed. The ratio of the capacitance per unit weight of the negative electrode active material to that of the positive electrode active material is 7.41.

In addition, the remaining cells are charged by a constant current-constant voltage charging in which a cell is charged at a constant current of 4000 mA until the voltage of the cell becomes 3.6 V and then at the constant voltage of 3.6 V continues to supply for one hour. After that, the cells are discharged at a constant current of 400 mA until the voltage of the cells become 1.6 V. Table 2 shows the capacity and the energy density of the cells when the cells are discharged for the third time after repeating the 3.6 to 1.6 V cycles.

TABLE 2

| Second example | Thickness of cell (mm) | Internal resistance (mΩ) | Capacity of cell (mAh) | Energy density (Wh/l) |
| --- | --- | --- | --- | --- |
| Positive electrode 2 | 10.0 | 4.82 | 386.7 | 18.1 |
| Positive electrode 3 | 10.2 | 4.85 | 385.9 | 17.8 |
| Positive electrode 4 | 9.9 | 5.14 | 362.6 | 17.2 |

It is evident that the first example, in which the thickness of the electrode current collector is below 40 μm, has lower internal resistance and higher energy density than the second example, in which the thickness of the electrode current collector is over 50 μm, even when slurry of the same material is used. In addition, it is preferable that the thickness of the electrode current collector be no thicker than 39 μm, since a thick electrode current collector is rigid and difficult to handle.

First Comparative Example

Positive electrode 5 is manufactured in the same manner as that of the first example except that the conductive layer is not formed or the positive electrode current collector, and positive electrode 5 and negative electrodes 1 to 3 are laminated to assemble two cells of film-type capacitors. The number of each of the positive and negative electrodes is seventeen in each type of the cells when the thickness of the cell is 10 mm.

Characteristic Evaluation of the Cell

After 14-days exposure to the room temperature, one of the cells for each capacitor each cell is disassembled. The result is that lithium ions are preliminarily charged in order to obtain the capacitance per unit weight of the negative electrode active material of over 650 F/g from the fact that the lithium metal is completely removed. The ratio of the capacitance per unit weight of the negative electrode active material to that of the positive electrode active material is 7.41.

In addition, a the remaining cells are charged by a constant current-constant voltage charging in which a cell is charged at a constant current of 4000 mA until the voltage of the cell becomes 3.6 V and then at the constant voltage of 3.6V continues to supply for one hour. After that, the cells are discharged at a constant current of 400 mA until the voltage of the cells become 1.6 V. Table 3 shows the capacity and the energy density of the cells when the cells are discharged for the third time after repeating the 3.6 to 1.6 V cycles.

TABLE 3

| First comparative example | Thickness of cell (mm) | Internal resistance (mΩ) | Capacity of cell (mAh) | Energy density (Wh/l) |
| --- | --- | --- | --- | --- |
| Negative electrode 1 | 9.9 | 24.7 | 328.7 | 14.9 |
| Negative electrode 2 | 9.9 | 25.0 | 328.0 | 14.7 |
| Negative electrode 3 | 9.9 | 25.2 | 327.8 | 14.5 |

The results are that the internal resistance increases, and the energy density decreases when conductive layers are not formed on the electrode current collectors having through-holes.

Third Example

Manufacturing of the Negative Electrode Current Collector By Etching

Non-aqueous conductive pain (binder: polyamide-imide) are printed by gravure printing and dried on a surface (front surface) of a 10 μm-thick copper foil (manufactured by Nippon Foil MFG Co., Ltd.) so as to form a 5 μm-thick conductive layer. In addition, non-aqueous conductive paint [binder, polyamide-imide] are printed by gravure printing and dried on the other surface (rear surface) of the copper foil so as to form a 5 μm-thick conductive layer having many through-holes. The diameter of the through-hole is 0.4 mmφ, and the area of through-holes occupy 25% of the copper foil.

Portions of the copper foil, which are exposed through the through-holes of the conductive layer on the rear surface, are dissolved by etching so as to obtain an electrode substrate for the negative electrode having through-holes. In this case, the through-holes of the copper foil are blocked with the conductive layer on the front surface, and the blocking ratio is 100%.

Manufacturing Method of the Negative Electrode 5

The slurry for the negative electrode used in the first example is coated by the direct comma method, dried and pressed on both surfaces of the electrode substrate for the negative electrode (20 μm-thick) in order to form a 57.5 μm-thick negative electrode active material layer on each surface, and then 135 μm-thick negative electrode 5 is obtained.

Preparation of the Cell

Two cells of film-type capacitors are assembled in the same manner as that of the first example except that 135 μm-thick negative electrode 5 and 330 μm-thick positive electrode 1 used in the first example are used. The number of each of the positive and negative electrodes is eighteen when the thickness of the cell is 10 mm. Since the number of each of the positive and negative electrodes is eighteen, lithium metal foils (205 μm, 5.0×7.0 cm$^2$) pressed on an 80 μm-thick stainless steel rats are used as the lithium metal, and disposed at the upper and lower surfaces of the electrode-laminated unit to face the negative electrodes.

Characteristic Evaluation of the Cell

After 14-days exposure of the room temperature, one of the two cells is disassembled. The result is that lithium ions are preliminarily charged in order to obtain the capacitance per unit weight of the negative electrode active material of over 650 F/q from the fact that the lithium metal is completely removed. The ratio of the capacitance per unit weight of the negative electrode active material to that of the positive electrode active material is 7.41.

In addition, the remaining cells are charged by a constant current-constant voltage charging in which a cell is charged at a constant current of 4000 mA until the voltage of the cell becomes 3.6 V and then at the constant voltage of 3.6V continues to supply for one hour. After that, the cell is discharged at a constant current of 400 mA until the voltage of the cell becomes 1.6 V. Table 4 shows the capacity and the energy density of the cell when the cell is discharged for the third time after repeating the 3.6 to 1.6V cycles.

Since a 10 μm-thick copper foil is soft and thus difficult to handle, generally, it is difficult to form through-holes in the copper foil. In addition, if conductive layers are formed or electrodes are coated on a foil with low tensile strength, it is likely to induce fractures in the foil or break the foil. However, the conductive layer increases the strength of the foil in the manufacturing method by etching according to the aspect of the invention), whereby it is possible to form the through-holes on an extremely thin, for example, 10 μm-thick copper foil, and to coat the electrode with general sprayers, for example, the direct comma method.

TABLE 4

|  | Thickness of cell (mm) | Internal resistance (mΩ) | Capacity of cell (mAh) | Energy density (Wh/l) |
|---|---|---|---|---|
| Third example | 10.2 | 4.13 | 435.1 | 19.9 |

In addition, layers having similar through-holes are formed on 7 and 10 μm-thick copper foils by photo-resistor, through-holes are formed by etching in the copper foils, and then the photo-resistor layers are washed out, whereby collecting foils for the negative electrode having through-holes with the porosity of 25% and no conductive layers are obtained. Although there has been an attempt to form conductive layers on the 7 and 10 μm-thick collecting foils for the negative electrode by the spray method, fractures occurred, and the foils broke while the current collector foils are wound, therefore manufacturing is halted.

Fourth Example

Manufacturing Method of Hard Carbon Slurry for the Negative Electrode

Granular phenol resin with average particle size of 20 μm (BELLPEARL R800, manufactured by kanebo, Ltd.) is heated up to 600° C. at a heating speed of 50° C./hour under nitrogen gas atmosphere in an electric furnace, and then held at the temperature for five hours. After that, the phenol resin is further heated up to 1200° C. at a heating speed of 80° C./hour, and then held at the temperature for ten hours. Then, the phenol resin is cooled and a sample of hard carbon is obtained. The sample of hard carbon is grinded by a ball mill so as to be hard carbon powder with an average particle size of 15 μm. The BET specific surface area of the powder is 8 m.sup.2/g.

92 parts by weight of the low-graphatized carbon powder, 4 parts by weight of acetylene black, 4 parts by weight of SBR, 1.2 parts by weight of carboxymethylcellulose, and 120 parts by weight of ion-exchanged water are mixed sufficiently to obtain slurry.

Measurement of the Capacitance Per Unit Weight of the Negative Electrode

The hard carbon slurry of the negative electrode is coated and dried on a surface of a 18 μm-thick copper foil, and then pressed so as to be a hard carbon negative electrode. The solid amount of the slurry is about 7 mg/cm$^2$. The negative electrode is cut into four 1.5×2.0 cm$^2$-size electrodes to obtain sample negative electrodes. 1.5×2.0 cm$^2$-size 200 μm-thick metal lithium layer is laminated with a 50 μm-thick polyethylene non-woven fabric interposed therebetween as the separator so as to assemble a sample cell. A metal lithium layer is used as a reference electrode. The 1 mol/l solution of LiPF$^6$ dissolved in propylene carbonate is used as an electrolytic solution.

The negative electrode is charged to 500 mAh/g of lithium ions per unit weight of the negative electrode active material at a charging current of 1 mA, and then discharged at 1 mA until the voltage becomes 1.5 V. The capacitance per unit weight of the negative electrode is 9865 F/g, which is estimated from the discharging time, that is the time required for the electrode potential to change as much as 0.2 V from the negative electrode one minute later from the beginning of the discharging.

Manufacturing Method of the Negative Electrode 6

Both surfaces of a 35 μm-thick (porosity of 50%) copper expanded metal (manufactured by Nippon Metal Industry Col, Ltd.) are coated with non-aqueous carbon-based conductive paint (manufactured by Acheson (Japan) Limited: ER-815) by the spray method, and then died so as to obtain an electrode substrate for the negative electrode having conductive layers. The hard carbon slurry for the negative electrode is coated on both surfaces of the electrode substrate for the negative electrode by the die method to obtain a negative electrode active material layer, the thickness of which is 57.5 μm on a single surface. After drying and pressing, the negative electrode 6, the total thickness of which is 160 μm, is obtained.

Preparation of the Cell

Two cells of film-type capacitors are assembled in the same manner as that of the first example except that 160 μm-thick negative electrode 6 and 330 μm-thick positive electrode 1 used in the first example are used. The number of each of the positive and negative electrodes is seventeen when the thickness of the cell is 10 mm. Since seventeen electrodes are laminated, lithium metal foils (215 μm, 5.0× 7.0 cm$^2$) pressed to 80 μm-thick stainless steel nets are used as the lithium metal, and disposed at the upper and lower surfaces of the electrode-laminated unit to face the negative electrodes. In addition, the weight of the negative electrode active material is 1.65 times larger than that of the negative electrode active material.

Characteristic Evaluation of the Cell

After 14-day exposure to the room temperature, one of the two cells is disassembled. The result ions are that lithium is preliminarily charged in order to obtain the capacitance per unit weight of the negative electrode activate material of over 9850 F/g from the fact that the lithium metal is completely removed. The ratio of the capacitance per unit weight of the negative electrode active material to that of the positive electrode active material is 109.7.

In addition, the remaining cell is charged by a constant current-constant voltage charging in which a cell is charged at a constant current of 4000 mA until the voltage of the cell becomes 3.3 V and then at the constant voltage of 3.3 V continues to supply for one hour. After that, the cell is discharged at a constant current of 200 mA until the voltage of the cell becomes 1.6 V. Table 5 shows the capacity and the energy density of the cell when the cell is discharged for the third time after repeating the 3.3 to 1.6 V cycles.

TABLE 5

| | Thickness of cell (mm) | Internal resistance (mΩ) | Capacity of cell (mAh) | Energy density (Wh/l) |
|---|---|---|---|---|
| Fourth example | 10.2 | 3.88 | 495.3 | 22.9 |

Fifth Example

Manufacturing Method of Mesoporous Carbon Slurry for the Positive Electrode 100 parts by weight of granular phenol resin with average particle size of 20 μm (BELLPEARL R800, manufactured by Kanebo, Ltd.) is mixed with an aqueous solution of cobalt chloride, the concentration of which is adjusted to contain a given amount of cobalt, and then dried in the air for twenty four hours. The dried sample is heated up to 1000° C. at a heating speed of 50° C./hour under nitrogen gas atmosphere in an electric furnace, and then held at the temperature for five hours. After that, the sample is cooled to make a carbonized sample, in which five parts by weight of cobalt are added. The sample is washed by diluted nitric acid, ion-exchange water and distilled water sequentially to remove the remaining cobalt. After that, the sample is dried at 115° C. for three hours, and then grinded by a ball mill so as to be mesoporous carbon powder with an average particle size of 7 μm.

Positive electrode mesoporous carbon slurry was obtained by sufficiently mixing 92 parts by weight of the mesoporous carbon powders 4 parts by weight of acetylene black, 4 parts by weight of SBR, 3.2 parts by weight of carboxymethyl-cellulose, and 15 parts by weight of ion-exchanged water.

Measurement of the Capacitance Per Unit Weight of the Positive Electrode

The slurry for the positive electrode is coated and dried on a surface of 20 μm-thick aluminum foil that has already been coated with a carbon-based conductive material and then pressed so as to be a mesoporous carbon positive electrode, the solid amount of which is about 7 mg/cm$^2$. The positive electrode is cut into three 1.5×2.0 cm$^2$-size electrodes, and one electrode is used as the positive electrode, the other electrodes are used as the negative and reference electrodes. The positive and negative electrodes are laminated with a 50 μm-thick paper non-woven fabric layer interposed therebetween as the separators in order to assembled a sample cell of the capacitor. The 1 mol/l solution of triethylmethylammonium tetrafluoroborate (TEMA.BF$^4$) dissolved in propylenecarbonate is used as an the positive electrolytic solution.

The cell is charged at the charging current of 10 mA until the voltage becomes 2.5 V, and then charged at a constant voltage. After one hour of charging, the cell is discharged at 1 mA until the voltage becomes 0 V. The capacitance per unit weight of the cell estimated from the discharging time while the voltage decreases from 2.0 to 1.5 V is 32 F/g. Also, the capacitance per unit weight of the positive electrode estimated similarly from the potential difference between the reference and positive electrodes is 132 F/g.

Manufacturing Method of Positive Electrode 6

Both surfaces of a 35 μm-thick (porosity of 50%) aluminum expanded metal (manufactured by Nippon Metal Industry Co., Ltd.), which is used in the first example, are coated with non-aqueous carbon-based conductive paint (manufactured by Acheson (Japan) Limited: EB-815 by the spray method, and then dried so as to obtain an electrode substrate for the positive electrode handing conductive layers. The mesoporous carbon slurry for the positive electrode is coated on both surfaces of the electrode substrate for the positive electrode, and then pressed so as to obtain a 330 μm-thick positive electrode 6.

Preparation of the Cell

Two Cells of film-type capacitors are assembled in the same manner as that of the first example except that 330 μm-thick positive electrode 6 and 157 μm-thick negative electrode 2 used in the first example are used. The number of each of the positive and negative electrodes is seventeen when the thickness of the cell is 10 mm. Since seventeen electrodes are laminated, lithium metal foils (195 μm, 5.0× 7.0 cm$^2$) pressed onto 80 μm-thick stainless steel nets are used as the lithium metal, and disposed at the upper and lower surfaces of the electrode-laminated unit to face the negative electrodes.

Characteristic Evaluation of the Cell

After 14-days exposure to the room temperature, one of the two cells is disassembled. The result is that lithium ions are preliminarily charged in order to obtain the capacitance per unit weight of the negative electrode activate material of over 650 F/g from the fact that the lithium metal is completely removed. The ratio of the capacitance per unit weight of the negative electrode active material to that of the positive electrode active material is 4.94.

In addition, the remaining cell is charged by a constant current-constant voltage charging in which a cell is charged at a constant current of 4000 mA until the voltage of the cell becomes 3.6 V and then at the constant voltage of 3.6 V continues to supply for one hour. After that, the cell is discharged at a constant current of 400 mA until the voltage of the cell becomes 1.6 V. Table 6 shows the capacity and the energy density of the cell when the cell is discharged for the third tire after repeating the 3.6 to 1.6 V cycles

TABLE 6

| | Thickness of cell (mm) | Internal resistance (mΩ) | Capacity of cell (mAh) | Energy density (Wh/l) |
|---|---|---|---|---|
| Fifth example | 10.1 | 4.53 | 564.9 | 26.2 |

The energy density is significantly increased by using the mesoporous carbon as the positive electrode activate material.

Sixth Example

Manufacturing Method of Pas Slurry 2 for the Negative Electrode

A mixture of 95 parts by weight of the negative electrode PAS powder used in the first example and 5 parts by weight of acetylene black powder is mixed with a solution in which 10 parts by weight of polyfluorovinylidene powder is dissolved in 120 parts by weight of N-methylpyrrolidone, in order to obtain a slurry.

Measurement of the Capacitance Per Unit Weight of the Negative Electrode

The slurry is coated and dried on a surface of a 18 μm-thick copper foil and then pressed so as to be a PAS negative electrode. The solid amount of the slurry is about 7 mg/cm2. The negative electrode is cut into 1.5×2.0 μm-size electrodes to obtain sample negative electrodes. The cutting 1.52×2.0 cm$^2$-size and 200 μm-thick metal lithium layers are laminated with a 50 μm-thick polyethylene non-woven fabric layer interposed therebetween as the separator in order to obtain a sample cell of the negative electrode. A metal lithium layer is used as the reference electrode. The 1 mol/l solution of $LiPF^6$ dissolved in propylene carbonate is used as the electrolytic solution.

The negative electrode is charged with 400 mAh of lithium ions per unit weight of the negative electrode active material at a charging current of 1 mA, and then discharged at 1 mA until the voltage becomes 1.5 V. The capacitance per unit weight of the negative electrode is 650 F/g, which is estimated from the discharging time, that is, the time required for the electrode potential to change as much as 0.2 V from the negative electrode one minute later from the beginning of the discharging.

Manufacturing Method of Active Carbon Slurry 2 for the Positive Electrode

A mixture of 95 parts by weight of the positive active carbon powder used in the first example and 5 parts by weight of acetylene black powder is mixed with a solution in which 10 parts by weight of polyfluorovinylidene powder is dissolved in 150 parts by weight of N-methylpyrrolidone, in order to obtain a slurry.

Measurement of the Capacitance Per Unit Weight of the Positive Electrode

The slurry is coated and dried on a surface of 20 μm-thick aluminum foil that has already been coated with a carbon-based conductive material and then pressed so as to be a positive electrode. The solid amount of the slurry is about 7 mg/cm$^2$. The positive electrode is cut into three 1.5×2.0 cm2-size electrodes, and one electrode is used as the positive electrode, the other electrodes are used as the negative and reference electrodes. The positive and negative electrodes are laminated with 50 μm-thick paper non-woven fabric layers interposed therebetween as the separator so as to obtain a sample cell of the capacitor. The 1 mol/l solution of triethylmethylammonium tetrafluoroborate (TEMA.BF$^4$) dissolved in propylenecarbonate is used as the positive electrolytic solution.

The cell is charged at a charging current of 10 mA until the voltage becomes 2.5V, and then charged at the constant voltage. After one hour of charging, the cell is discharged at 1 mA until the voltage becomes 0 V. The capacitance per unit weight of the cell estimated from the discharging time while the voltage decreases from 2.0 to 1.5 V is 21 F/g. Also, the capacitance per unit weight of the positive electrode estimated similarly from the potential difference between the reference and positive electrodes is 83 F/g.

Manufacturing Method of Negative Electrode 7

Both surfaces of a 35 μm-thick (porosity of 50%) copper expanded metal (manufactured by Nippon Metal Industry Co., Ltd.) are coated with an aqueous carbon-based conductive paint (manufactured by Nippon Graphite industries, Ltd.: Varniphite T702A) by the spray method, and then dried so as to obtain an electrode substrate for the positive electrode having conductive layers. The total thickness of the electrode substrate is 45 μm, and all through-holes are blocked with conductive materials, whereby the blocking ratio is 98%. The slurry for the negative electrode is coated on both surfaces of the electrode substrate for the negative electrode, and then pressed so as to obtain a total 160 μm-thick negative electrode 7.

Manufacturing Method of Positive Electrode 7

Both surfaces of a 35 μm-thick [porosity of 50%] aluminum expanded metal (manufactured by Nippon Metal Industry Co., Ltd.) are coated with an aqueous carbon-based conductive paint (manufactured by Nippon Graphite Industries, Ltd.: Varniphite T702A) by the spray method, and then dried so as to obtain an electrode substrate fox the positive electrode having conductive layers. The total thickness of the electrode substrate is 45 μm, and almost all through-holes are blocked with conductive materials, whereby the blocking ratio is 98%. The above slurry for the positive electrode is coated on both surfaces of the electrode substrate for the positive electrode, and then pressed so as to obtain a 330 μm-thick positive electrode 7.

Preparation of the Cell

Two cells of film-type capacitors are assembled in the same manner as that of the first example except that 330 μm-thick positive electrode 7 and 160 μm-thick negative electrode 7 are used. The number of each of the positive and negative electrodes is seventeen when the thickness of the cell is 10 mm. Since seventeen electrodes are laminated, lithium metal foils (175 μm 5.0×7.0 cm$^2$) pressed onto an 80 μm-thick stainless steel nets are used as the lithium metal, and disposed at the upper and lower surfaces of the electrode-laminated unit to face the negative electrodes. In addition, the weight of the positive electrode active material is 1.96 times larger than that of the negative electrode active material.

Characteristic Evaluation of the Cell

After 14-days exposure to the room temperature, one of the two cells is disassembled. The result is that lithium ions are preliminary charged in order to obtain the capacitance per unit weight of the negative electrode active material of over 650 F/g from the fact that the lithium metal is completely removed. The ratio of the capacitance per unit weight of the negative electrode active material to that of the positive electrode active material is 7.83.

In addition, the remaining cell is charged by a constant current-constant voltage charging in which a cell is charged at a constant current of 4000 mA until the voltage of the cell becomes 3.6 V and then at the constant voltage of 3.6 V continues to supply for one hour. After that, the cell is discharged at a constant current of 400 mA until the voltage of the cell becomes 1.6 V. Table 7 shots the capacity and the energy density of the cell when the cell is discharged for the third time after repeating the 3.6 to 1.6 V cycles.

TABLE 7

| | Thickness of cell (mm) | Internal resistance (mΩ) | Capacity of cell (mAh) | Energy density (Wh/l) |
|---|---|---|---|---|
| Sixth example | 10.1 | 4.37 | 405.2 | 18.9 |

Although the organic electrolyte capacitor having high energy density can be obtained like the first example even when an aqueous binder is used for the conductive layer of the electrode substrate and a non-aqueous binder is used for the electrode active material layer, a small amount of gas is generated from the cell after the measurement since it is difficult to remove NMP, which is a solvent, completely from the activated carbon of the positive electrode. In addition, the capacitance of the positive electrode decreases from the above reason, whereby the energy density is slightly lower than that of the first example.

Since cells must be dried for a long time under high temperature and vacuum in order to remove NMP completely from electrodes having high specific surface area such as activated carbon, the productivity and environmental adaptation of the cells deteriorate, therefore it is preferable to use an aqueous binder for the electrode active material layer.

In addition, with respect to the coating of the electrode active material layer when an aqueous binder is used for the conductive layer of the electrode substrate and a non-aqueous binder is used for the electrode active material layer, it is likely that the slurry leaks through the through-holes of the electrode current collector due to the excessively high affinity between the electrode slurry and the conductive layer. Further, since there are problems in the adhesiveness between the electrode active material layer and the conductive layer, it is most preferable to use a non-aqueous binder for the conductive layer and an aqueous binder for the electrode active material layer in the present invention.

Seventh Example

Manufacturing Method of PAS Slurry for the Positive Electrode

An aqueous solution, in which water-soluble resole (concentration of about 60%)/zinc chloride/water are mixed by weight ratio of 10/25/4, is injected into a 100 mm×100 mm×2 mm-volume mold, a glass plate is put on the mold in order to prevent the vaporization of water, and then the solution is heated at about 100° C. for one hour for hardening.

The phenol resin is heated under nitrogen stream at a hearing speed of 40° C./hour in an electric furnace until the temperature becomes 600° C. After that, the thermally treated phenol resin is washed by dilute hydrochloric acid and water sequentially, and then dried to obtain sheet-shaped PAS. The PAS is grinded by a ball mill so as to be PAS powder with an average particle size of 7 μm. The BET specific surface area of the powder is 1900 m2/g, and the H/C by the elementary analysis is 0.23.

92 parts by weight of the above-mentioned PAS powder, 4 parts by weight of acetylene black powder, 4 parts by weight of SBR, 1 part by weight of carboxyethylenecellulose, and 150 parts by weight of ion-exchanged water are mixed sufficiently to obtain a slurry.

Measurement of the Capacitor Per Unit Weight of the Positive Electrode

The slurry is coated and dried on a surface of 20 μm-thick aluminum foil that has already been coated with a carbon-based conductive material and then pressed so as to be a positive electrode, the solid amount of the slurry is about 7 mg/cm2. The positive electrode is cut into three 1.5×2.0 cm2-size electrodes, and one electrode is used as the positive electrode and the other electrodes are used as the negative and reference electrodes. The positive and negative electrodes are laminated with a 50 μm-thick paper anon-woven fabric layer interposed therebetween as the separator so as to obtain a sample cell of the capacitor. The 1 mol/l solution of triethylmethylammonium tetrafluoroborate (TEMA.BF$^4$) dissolved in propylenecarbonate is used as the positive electrolytic solution.

The cell is charged at a charging current of 10 mA until the voltage becomes 2.5 V, and then charged at the constant voltage. After one hour of charging, the cell is discharged at 1 mA until the voltage becomes 0 V. The capacitance per unit weight of the cell estimated from the discharging time while the voltage decreases from 2.0 to 1.5 V is 23 F/g. Also, the capacitance per unit weight of the positive electrode estimated similarly from the potential difference between the reference and positive electrodes is 91 F/g.

Manufacturing Method of Positive Electrode 8

Both surfaces of a 35 μm-thick (porosity of 50%) aluminum expanded metal (manufactured by Nippon Metal Industry Co., Ltd.) are coated with a non-aqueous carbon-based conductive paint (manufactured by Acheson (Japan) Limited: EB-815) by the spray method, and then dried so as to obtain an electrode substrate for the positive electrode having conductive layers. The total thickness of the electrode substrate is 45 μm, and almost all through-holes are blocked with conductive materials, whereby the blocking rate is 98%. The above slurry for the positive electrode is coated on both surfaces of the positive electrode current collector in the same manner as the first example, and then pressed so as to obtain a 330 μm-thick positive electrode 8.

Preparation of the Cell

Two cells of film-type capacitors are assembled in the same manner as that of the first example except that 330 .mu.m-thick positive electrode 8 and 157 μm-thick negative electrode 2 used in the first example are used. The number of each of the positive and negative electrodes is seventeen when the thickness of the cell is 10 mm. Since seventeen electrodes are laminated, lithium metal foils (195 μm, 5.0× 7.0 cm$^2$) pressed onto 80 μm-thick stainless steel nets are used as the lithium metal, and disposed at the upper and lower surfaces of the electrode-laminated unit to face the negative electrodes. In addition, the weight of the positive electrode active material is 1.65 times larger than that of the negative electrode active material.

Characteristic Evaluation of the Cell

After 14-days exposure to the room temperature, each one of the two cells is disassembled. The result is that lithium ions are preliminarily charged in order to obtain the capacitance per unit weight of the negative electrode active material of over 650 F/g from the fact that the lithium metal is completely removed. The ratio of the capacitance per unit weight of the negative electrode active material so that of the positive electrode active material is 7.16.

In addition the remaining cell is charged by a constant current-constant voltage charging in which a cell is charged at a constant current of 4000 mA until the voltage of the cell becomes 3.6 V and then at the constant voltage of 3.6 V continues to supply for one hour. After that, the cell is discharged at a constant current of 400 mA until the voltage of the cell becomes 1.6 V. Table 8 shows the capacity and the energy density of the cell when the cell is discharged for the third time after repeating the 3.6 to 1.6 V cycles.

The organic electrolyte capacitor having high energy density can be obtained even when PAS is used as the positive electrode active material.

TABLE 8

| | Thickness of cell (mm) | Internal resistance (mΩ) | Capacity of cell (mAh) | Energy density (Wh/1) |
|---|---|---|---|---|
| Seventh example | 10.1 | 4.59 | 422.2 | 19.7 |

Eighth Example

Manufacturing Method of Positive Electrodes 9 to 11

Both surfaces of a 35 μm-thick (porosity of 50%) aluminum expanded metal (manufactured by Nippon Metal Industry Co., Ltd.) are coated with a non-aqueous carbon-based conductive paint (Manufactured by Acheson (Japan) Limited: EB-815) by the spray method, and then dried so as to obtain an electrode substrate for the positive electrode having conductive layers. The total thickness of the electrode substrate is 45 μm, and almost all through-holes are blocked with conductive materials, whereby the blocking ratio is 98%. The slurry for the positive electrode used in the first example is coated on both surfaces of the positive electrode current collector by the die method to form 90, 142.5 and 170 μm-thick positive electrode active material layer on each of the surfaces, and then pressed so as to obtain 225, 330 and 385 μm-thick positive electrodes 9, 10 and 11. That is, positive electrode 10 is the same electrode as positive electrode 1 in the first example.

Preparation of the Cell

Two cells of film-type capacitors are assembled for each of the positive electrodes 9 to 11 in the same manner as that of the first example except that 157 μm-thick negative electrode 2 of the first example and 225, 330 and 385 μm-thick positive electrode 9, 10 and 11 are used. The number of the electrodes is twenty-one for positive electrode 9, seventeen for positive electrode 10, and fifteen for positive electrode 11 were the thickness of the cell is 10 mm. In addition, the weight of the positive electrode active material is 1.04 times larger than that of the negative electrode active material in the cell using positive electrode 9, 1.65 times larger in the cell using positive electrode 10, and 1.97 times larger in the cell using positive electrode 11. Lithium metal foils (240 μm, 5.0×7.0 cm$^2$), lithium metal foils (195 μm, 5.0×7.0 cm$^2$) and lithium metal foils (170 μm, 5.0×7.0 cm$^2$) pressed onto 80 μm-thick stainless steel nets respectively are used as the lithium metal for the cells using positive electrode 9, 10 and 11, and disposed at the upper and lower surfaces of the electrode-laminated unit to face the negative electrodes.

Characteristic Evaluation The Cell

After 14-days exposure to the room temperature, one of the two cells is disassembled. It is turned out that lithium ions are preliminarily charged in order to obtain the capacitance per unit weight of the negative electrode active material of over 650 F/g from the fact that the lithium metal is completely removed. The ratio of the capacitance per unit weight of the negative electrode active material to that of the positive electrode active material is 7.41.

In addition, the remaining cells are charged by a constant current-constant voltage charging in which a cell is charged at a constant current of 4000 mA until the voltage of the cell becomes 3.6 V and then at the constant voltage of 3.6 V continues to supply for one hour. After that, the cells are discharged at a constant current of 400 mA until the voltage of the cell becomes 1.6 V. Table 9 shows the capacity and the energy density of the cell when the cells are discharged for the third time alter repeating the 3.6 to 1.6 V cycles.

TABLE 9

| Eighth example | Thickness of cell (mm) | Internal resistance (mΩ) | Capacity of cell (mAh) | Energy density (Wh/1) |
|---|---|---|---|---|
| Positive electrode 9 | 10.0 | 3.69 | 368.4 | 17.8 |
| Positive electrode 10 | 10.1 | 4.57 | 409.3 | 19.1 |
| Positive electrode 11 | 9.9 | 5.14 | 365.5 | 17.5 |

The capacity of a cell is mainly determined by the ratio of the thickness among electrode active material layer, electrode current collector and separator. That is, the higher the ratio of the electrode active material layer, the larger the capacity of the cell. However, if the thickness of the electrode active material layer is increased too much in order to increase the ratio of the electrode active material layer, the resistance increases, and thus higher capacity cannot the obtained. The properties or using methods of batteries can affect the capacity.

In the organic electrolyte capacitor according to the aspect of the invention, although it is expected that positive electrode 11 shows higher energy density than positive electrode 10, and positive electrode 10 shows higher energy density than positive electrode 9 at the eighth example, positive electrode 10 shows highest energy density in the actual measurement. That is, a satisfactory capacity cannot be obtained when the thickness of the positive electrode is as thick as 365 μm, on the contrary, a satisfactory capacity can be obtained and the internal resistance is low when the thickness of the positive electrode is as thick as 225 μm.

Ninth Example

Formation of the Conductive Layer of the Positive Electrode Current Collector

Both surfaces of a 35 μm-thick (porosity of 50%) aluminum expanded metal (manufactured by Nippon Metal Industry Co., Ltd.) are coated with a non-aqueous carbon-based conductive paint (manufactured by Acheson (Japan) Limited: EB-815) by the spray method, and then dried so as to obtain an electrode substrate for the positive electrode having conductive layers. The blocking states of the through-holes are controlled by performing the above processes under four different conditions, whereby the blocking ratio is 50, 70, 85 and 95% (the thickness of the electrode substrates including that of the conductive layers are 45 μm in all cases).

Manufacturing Method of Positive Electrodes 12 to 15

The slurry for the positive electrode used in the first example are coated by the direct comma method on the four kinds of electrode substrates for the positive electrode until the thickness of the electrode active material layer becomes 150 μm after drying. There is no difficulty in coating on the electrode substrate with the blocking ratio of 95%, and it is also possible to coat on the electrode substrate with the blocking rate of 85%, although, there is a slight leakage of water. However, the slurry leaks from the through-holes and stagnate in slit portions of the comma, and then the positive electrode current collector is broken with the electrode substrates of the blocking ratio of 50 and 70%. After the above coating, the rear surfaces of the electrode substrates with the blocking ratios of 85 and 95% are coated also by the direct comma method, dried, and pressed so as to obtain 330 μm-thick positive electrodes.

On the other hand, both surfaces of the electrode current substrates for the positive electrode of the positive electrode current collector with the blocking ratios of 50 and 70% are coated by the die method so as to for the electrode active material layers on both surfaces, and then 330 μm-thick activated carbon positive electrodes are obtained after pressing. The positive electrode using the current collector with the blocking ratio of 50% becomes positive electrode 12, the positive electrode using the current collector with the blocking ratio of 70% becomes positive electrode 13, the positive electrode using the current collector with the blocking ratio of 85% becomes positive electrode 14, and the positive electrode using the collector with the blocking ratio of 95% becomes positive electrode 15.

Preparation of the Cell

Two cells of film-type capacitors are assembled for each of the positive electrodes 12 to 15 in the same manner as that of the first example except that 330 μm-thick activated carbon positive electrodes 12 to 15 and 150 μm-thick negative electrode 1 used in the first example are used. The number of each of the positive and negative electrodes is seventeen when the thickness of the cell is 10 mm. In addition, since seventeen electrodes are laminated, lithium metal foils (195 μm, 5.0×7.0 cm$^2$) pressed onto 80 μm-thick stainless steel nets are used as the lithium metal in all cases, and disposed at the upper and lower surfaces of the electrode-laminated unit to face the negative electrodes.

Characteristic Evaluation of the Cell

After 14-days exposure to the room temperature, one of the two cells is disassembled. The result is that lithium ions are preliminarily charged in order to obtain the capacitance per unit weight of the negative electrode active material of over 650 F/g from, the fact that the lithium metal is completely removed. The ratio of the capacitance per unit weight of the negative electrode active material to that of the positive electrode active material is 7.41.

In addition, the remaining cells are charged by a constant current-constant voltage charging in which a cell is charged at a constant current of 4000 mA until the voltage of the cell becomes 3.6 V and then at the constant voltage of 3.6 V continues to supply for one hour. After that, the cells are discharged at a constant current of 400 mA until the voltage of the cell becomes 1.6 V. Table 10 shows the capacity and the energy density of the cells when the cells are discharged for the third time after repeating the 3.6 to 1.6 V cycles.

TABLE 10

| Ninth example | Thickness of cell (mm) | Internal resistance (mΩ) | Capacity of cell (mAh) | Energy density (Wh/1) |
|---|---|---|---|---|
| Positive electrode 12 | 10.0 | 4.83 | 406.2 | 19.1 |
| Positive electrode 13 | 10.1 | 4.72 | 404.6 | 19.0 |
| Positive electrode 14 | 9.9 | 4.56 | 410.5 | 19.4 |
| Positive electrode 15 | 9.9 | 4.45 | 411.2 | 19.5 |

Even when the slurry of the same active material is used, the coating method is limited with the electrode current collectors with the blocking ratio of 80% or less. For example, when both surfaces are coated by the die method such as the coatings of positive electrodes 9 and 10, coating must be performed on the electrode current collectors wound up vertically. When the electrode current collectors must be wound up, dryers must be installed vertically, and the electrode can be broken by its own weight when the drying area is long, since the strength of the electrode current collector having the through-holes is weak. Therefore, the drying zone must be short, and the coating speed must be lowered, therefore the productivity deteriorates. Further, the coating precision also decreases, and thus the producing yield also decreases.

On the other hand, when electrodes have the blocking rates of over 80% such as positive electrodes 11 and 12, almost no slurry leaks from the rear surface, whereby it is possible to coat the electrodes face-by-face by the direct comma or die method. As a result, the coating speed, productivity and precision of the electrode are high. The ninth example shows that positive electrodes 11 and 12, which are coated face-by-face, have slightly lower internal resistances than positive electrodes 9 and 10, both surfaces of which are coated at the same time. Therefore, it is preferable that the through-holes be blocked with conductive materials in order to make the blocking ratio over 80%, more preferably, over 90%, which will make the productivity and performance of the electrodes improve.

Tenth Example

Manufacturing Method of Negative Electrodes 8 To 12

Both surfaces of a 25 µm-thick (porosity of 50%) copper expanded metal (manufactured by Nippon Metal Industry Co., Ltd.), which is used in the first example, are coated with a non-aqueous carbon-based conductive paint (manufactured by Acheson (Japan) limited: EB-815) by the spray method, and then dried so as to obtain an electrode substrate for the negative electrode having conductive layers. The total thickness of the electrode substrate is 35 µm, and almost all through-holes are blocked with conduct is materials, whereby the blocking ratio is 98%. The slurry for the negative electrode current used in the first example is coated on both surfaces of the negative electrode collector by the die method to form 25, 35, 55, 80 and 120 µm-thick negative electrode active material layers on each or the surfaces, and then pressed so as to obtain 85, 105, 145, 195 and 275 µm-thick negative electrodes 8, 9, 10, 11 and 12.

Preparation of the Cell

Two cells of film-type capacitors are assembled for each of the of negative electrodes 8 to 12 in the same manner as that of the first example except that 225 µm-thick positive electrode 9 of the eighth example and 85, 105, 145, 195 and 275 µm-thick negative electrodes 8, 9, 10, 11 and 12 are used. The number of each of the positive and negative electrodes is twenty six for the cell using negative electrode 8, twenty four for the cell using negative electrode 9, twenty one for the cell using negative electrode 10, nineteen for the cell using negative electrode 11, and sixteen for the cell using negative electrode 12, when the thickness of the cell is 10 mm.

In addition, the weight of the positive electrode active material is 2.40 times heavier than that of the negative electrode active material in the cell using negative electrode 8, 1.71 times heavier in the cell using negative electrode 9, 1.09 times heavier in the cell using negative electrode 10, 0.75 times heavier in the cell using negative electrode 11, and 0.05 times heavier in the cell using negative electrode 12. Lithium metal foils (130 µm, 5.0×7.0 cm$^2$), lithium metal foils (165 µm, 5.0×7.0 cm$^2$) lithium metal foils (230 µm, µm, 5.0×7.0 cm$^2$) lithium metal foils (300 µm, 5.0×7.0 cm$^2$) and lithium metal foils (380 µm, 5.0×7.0 cm$^2$) pressed onto 80 µm-thick stainless nets, respectively, are used as the lithium metal for the cells using negative electrode 8, 9, 10, 11 and 12, and disposed at the upper and lower surfaces of the electrode-laminated unit to face the negative electrodes.

Characteristic Evaluation of the Cell

After 14-day exposure to the room temperature, one of the two each cells is disassembled. The result is that lithium ions are preliminarily charged in order to obtain the capacitance per unit weight of the negative electrode active material of over 650 F/g from the fact that the lithium metal is completely removed. The ratio of the capacitance per unit weight of the negative electrode active material to that of the positive electrode active material is 7.41.

In addition, the remaining cells are discharged by a constant current-constant voltage charging in which a cell is charged at a constant current of 4000 mA until the voltage of the cell becomes 3.6 V and then at the constant voltage of 3.6 V continues to supply for one hour. After that, the cells are discharged at a constant current of 400 mA until the voltage of the cell becomes 1.6 V. Table 11 shows the capacity and the energy density of the cells when the cells are discharged for the third time after repeating the 3.6 to 1.6 V cycles.

TABLE 11

| Tenth example | Thickness of cell (mm) | Internal resistance (mΩ) | Capacity of cell (mAh) | Energy density (Wh/l) |
|---|---|---|---|---|
| Negative electrode 8 | 10.2 | 3.02 | 388.3 | 17.9 |
| Negative electrode 9 | 10.0 | 3.28 | 386.8 | 18.1 |
| Negative electrode 10 | 9.9 | 3.66 | 365.5 | 17.5 |
| Negative electrode 11 | 10.2 | 4.11 | 344.8 | 16.0 |
| Negative electrode 12 | 10.1 | 4.82 | 298.9 | 13.7 |

Similar to the feature comparison by the thickness of the positive electrode active material layer in the eighth example, it is turned out from the result of the thickness comparison of the negative electrodes in the tenth embodiment that the capacity is not proportional to the thickness of the electrode active material layer, and shows the maximum value at a certain thickness in the organic electrolyte capacitor according to the aspect of the invention. Although the organic electrolyte capacitor shows higher energy density than common electric double-layer capacitor even when the negative electrode active material layer is thick, it is preferable that the thickness of the negative electrode active material layer be below 100 µm on a single surface, more preferably below 80 µm. In addition, it is preferable that the weight of the positive electrode active material layer be heavier than that of the negative electrode active material layer.

Eleventh Example

Manufacturing of a Sample Cell

Two cells of film-type capacitors are assembled in the same manner as that of the fifth embodiment except that 1 mol/l solution of $LiBF^4$ dissolved in propylenecarbonate is used as the electrolytic solution. A positive electrode 6 (total thickness: 330 μm) and negative electrode 2 (total thickness: 157 μm) are used.

The number of each of the positive and negative electrodes in seventeen when the thickness of the cell is 10 mm. In addition, since seventeen electrodes are laminated, lithium metal foils (195 μm, 5.0×7.0 cm²) pressed onto 80 μm-thick stainless steel nets are used as the lithium metal, and disposed at the upper and lower surfaces of the electrode-laminated unit to face the negative electrodes.

Characteristic Evaluation of the Cell

After 14-days exposure to the room temperature, one of the two cells is disassembled. The result is that lithium ions are preliminary charged in order to obtain the capacitance per unit weight of the negative electrode active material of over 650 F/g from the fact that the lithium metal is completely removed. The ratio of the capacitance per unit weight of the negative electrode active material to that of the positive electrode active material is 4.94.

In addition, the remaining cell is charged by a constant current-constant voltage charging in which a cell is charged at a constant current of 4000 mA until the voltage of the cell becomes 3.6 V and then at the constant voltage of 3.6 V continues to supply for one hour. After that, the cell is discharged at a constant current of 400 mA until the voltage of the cell becomes 1.6 V. Table 12 shows the capacity of the cell and the energy density when the cell is discharged for the third time after repeating the 3.6 to 1.6 V cycles.

Although the internal resistance increases slightly when $LiBF^4$ is used as the lithium salt chloride and propylenecarbonate is used as the apriotic organic solvent, large energy density is obtained.

TABLE 12

|  | Thickness of cell (mm) | Internal resistance (mΩ) | Capacity of cell (mAh) | Energy density (Wh/l) |
|---|---|---|---|---|
| Eleventh example | 10.1 | 6.65 | 553.2 | 25.8 |

Twelfth Example

Manufacturing Method of the Negative Electrode Current Collector By Etching

A non-aqueous conductive paint (binder: polyamide-imide) is printed by gravure printing and dried on a surface (front surface) of a 14 μm-thick copper foil (manufactured by Nippon, Foil MFG Co., Ltd.) so as to form a 5 μm-thick conductive layer. In addition, a non-aqueous conductive paint (binder: polyamide-imide) is printed by gravure printing and dried on the other surface (rear surface) of the copper foil so as to form a 5 μm-thick conductive layer having many through-holes. The diameter of the through-hole is 0.4 mmφ, and the through-holes occupy 25% of the aluminum foil.

Portions of the copper to foil, which are exposed through the through-holes of the conductive layer on the rear surface, are dissolved by etching so as to obtain an electrode substrate for the positive electrode having through-holes. In this case, the through-holes of the copper foil are blocked with the conductive layer on the front surface, and the blocking rate is 100%.

Manufacturing Method of the Positive Electrode Current Collector By Etching

A non-aqueous conductive paint (binder polyamide-imide) is printed by gravure printing and dried as a surface (front surface) of a 30 μm-thick aluminum foil (manufactured by Nippon foil MFG Co., Ltd.) so as to form a 5 μm-thick conductive layer. In addition, a non-aqueous conductive paint (binder: polyamide-imide) printed by gravure printing and dried on the other surface [rear surface] of the aluminum foil so as to form a 5 μm-thick conductive layer having many through-holes. The diameter of the through-hole is 0.4 mmφ, and the through-holes occupy 25% of the aluminum foil.

Portions of the aluminum foil, which are exposed through the through-holes of the conductive layer on the rear surface, are dissolved by etching so as to obtain an electrode substrate for the positive electrode having through-holes. In this case, the through-holes of the aluminum foil are blocked with the conductive layer on the front surface, and the blocking rate is 100%.

Manufacturing Method of Negative Electrode 13

The slurry for the negative electrode used in the first example is coated by the direct comma method and dried on both surfaces of the (24 μm-thick) electrode substrate for the negative electrode to form a 57.5 μm-thick negative electrode active material layer on each of the surfaces of the substrate. Then a 139 μm-thick negative electrode 13 is obtained after pressing.

Manufacturing Method of Positive Electrode 16

The slurry for the positive electrode used in the first example is coated by the direct comma method and dried on both surfaces of the 440 μm-thick) electrode substrate for the positive electrode to form a 142.5 μm-thick positive electrode active material layer on each of the surfaces of the substrate. Then a 325 μm-thick positive electrode 16 is obtained after pressing.

Preparation of the Cell

The electrodes are cut into ribbon-shaped electrodes having sizes of 7.0×800 cm2. A 10 mm-wide, 50 mm-long and 0.2 mm-thick aluminum positive terminal previously having a sealant film at the sealing portion and a 10 mm-wide, 50 mm-long and 0.2 mm-thick copper negative terminal previously having a sealant film at the sealing portion are welded to the connecting terminal welding portions of the positive and negative electrode current collectors respectively, which are disposed at the opposite sides to each other. 25 μm-thick cellulose/rayon mixed non-woven fabrics as the separators and the electrodes are wound elliptically as shown in FIG. 15, and then so as to obtain a wound electrode.

Lithium metal foils (180 μm, 5.0×7.0 cm²) pressed onto a 80 μm-thick stainless net are used as the lithium metal, and disposed on the upper and lower surfaces of the electrode winder. The stainless steel net, onto which lithium is pressed, is welded to the copper-made negative terminal.

The wound electrode is installed in two exterior films drawn as long as 5 mm (having a space of total 10 mm the electrode). After two sides, in which the terminals exist, and another side of the exterior laminated films are thermally bonded, 1 mol/l solution of LiPF$^6$ dissolved in a mined solvent, in which ethylene carbonate, diethyl carbonate and propylene carbonate are mixed by weigh ratio of 3:4:1, is impregnated into the capacitor as the electrolytic solution under vacuum, and then the remaining side is thermally bonded under reduced pressure so as to be sealed under vacuum. Therefore, two cells of the film-type capacitors are assembled.

Characteristic Evaluation of the Cell

After 14-days exposure to the room temperature, one of the two cells is disassembled. The result that lithium ions are preliminarily charged in order to obtain the capacitance per unit weight of the negative electrode active material of over 650 F/g. It turned out from the fact that the lithium metal is completely removed. The ratio of the capacitance per unit weight of the negative electrode active material to that of the positive electrode active material is 7.41.

In addition, the remaining cell is charged by a constant current-constant voltage charging in which a cell is charged at a constant current of 4000 mA until the voltage of the cell becomes 3.6 V and then at the constant voltage of 3.6 V continues to supply for one hour. After that, the cell is discharged at a constant current of 400 mA until the voltage of the cell becomes 1.6 V.

TABLE 13

|  | Thickness of cell (mm) | Internal resistance (mΩ) | Capacity of cell (mAh) | Energy density (Wh/l) |
| --- | --- | --- | --- | --- |
| Twelfth example | 10.1 | 4.82 | 386.2 | 19.7 |

High energy density can be obtained even in the roll-type structure, which is the second embodiment of the invention, like the laminated structure.

EFFECT OF THE INVENTION

As described above, an organic electrolyte capacitor according to the aspect of the present invention is an organic electrolyte capacitor including positive electrodes, negative electrodes and an electrolyte capable of transferring lithium ion, in which the positive electrodes contain a substance capable of carrying lithium ion and/or anions reversibly as a positive electrode active material, the negative electrodes contain a substance capable of carrying lithium ions as a negative electrode active material, and the positive and negative electrodes have the positive and negative electrode active material layers provided on an electrode substrate that has a conductive layer made of a conductive material on electrode current collectors, which have through-holes that penetrate the front and rear surfaces. In the organic electrolyte capacitor according to the aspect of the invention, the electrode current collectors having the through-holes are made thin, and the conductive layers and active material layers are made thin and strong, whereby high energy density can be held, and high power can be secured.

Also, it facilitates the thickness-reduction of the electrode current collectors if conductive layers are formed on imperforate metal foils and through-holes are formed in the metal foils by etching in order to obtain the electrode current collectors. Further, when over 80% of through-holes of the positive and negative electrodes are blocked with conductive materials, the conductive layer or active material layer becomes highly adhesive, and the organic electrolyte capacitor can have low internal resistance, high reliability and high performance. Furthermore, the above effects can be improved by using specific combinations of conductive layer binders and active material binders layer and of positive electrode active material, and negative electrode active material.

INDUSTRIAL APPLICABILITY

The organic electrolyte capacitor according to the aspect of the invention having the above-mentioned features is extremely effective as a storage device for driving or auxiliary storage device for electric vehicle, hybrid electric vehicle, fuel cell vehicle and the like. Also, the organic electrolyte capacitor can be properly used as a storage device for driving or auxiliary storage device for motor vehicle, motor scooter, power chair and the like. Further, the capacitor can be properly used as storage device of electric energies generated by solar or wind power generation, and as an uninterruptible power supply system, storage device of domestic electric device and the like.

The invention claimed is:

1. An organic electrolyte capacitor including a positive electrode, a negative electrode and an electrolyte capable of transferring lithium ions,
    wherein the positive electrode contains a substance capable of carrying lithium ions and/or anions reversibly as a positive electrode active material, the negative electrode contains a substance capable of carrying lithium ions reversibly as a negative electrode active material, and
    wherein the positive and negative electrodes include the positive or negative electrode active material layer on an electrode substrate that has a conductive layer made of a conductive material on an electrode current collector, which has a through-hole that penetrates the front and rear surfaces and at least part thereof is filled with the conductive material, and the negative electrode electrochemically carries lithium ions.

2. The organic electrolyte capacitor according to claim 1, wherein the electrode substrate is a three-layer laminate including a first conductive layer that is made of a conductive material and has many through-holes on a surface of an imperforate metal foil and a second conductive layer that is made of a conductive material and has holes or no holes on the other surface of the imperforate metal foil, and has through-holes in the imperforate metal foil, which are formed by etching the laminate.

3. The organic electrolyte capacitor according to claim 1, wherein over 80% of the through-holes of the electrode current collectors are blocked with the conductive material.

4. The organic electrolyte capacitor according to claim 1, wherein the electrode current collectors are made of either copper or aluminum as a main component.

5. The organic electrolyte capacitor according to claim 1, wherein the conductive layers are made of a conductive material containing a conducting agent and a non-aqueous binder, the positive electrode active material layer contains the positive electrode active material and an aqueous binder, and the negative electrode active material layer contains the negative electrode active material and an aqueous binder.

6. The organic electrolyte capacitor according to claim 1, wherein the electrolyte is an aprotic organic solvent solution of a lithium salt.

7. The organic electrolyte capacitor according to claim 1, wherein the capacitance per unit weight of the negative electrode active material is more than three times of the capacitance per unit weight of the positive electrode active material, and the weight of the positive electrode active material is larger than the weight of the negative electrode active material.

8. The organic electrolyte capacitor according to claim 1 wherein the organic electrolyte capacitor is formed by winding an electrode pair having the positive and negative electrodes.

9. The organic electrolyte capacitor according to claim 1 wherein the organic electrolyte capacitor is formed by laminating electrode pairs having the positive and negative electrodes.

10. The organic electrolyte capacitor according to claim 1, wherein the negative electrode active material is a thermally treated aromatic condensation polymer, and an insoluble and infusible base having a polyacene skeletal structure in which hydrogen/carbon atomic ratio is in the range of 0.50 to 0.05.

11. The organic electrolyte capacitor according to claim 1, wherein the positive electrode active material is mesoporous carbon.

12. The organic electrolyte capacitor according to claim 1, wherein the electrode current collectors have a thickness of 10 to 39 μm and a porosity of 10 to 90%.

13. The organic electrolyte capacitor according to claim 1, wherein thickness of the conductive layer on one surface of the positive electrode is in the range of 1 to 20 μm, the thickness of the positive electrode active material layer on one surface of the positive electrode is in the range of 50 to 175 μm, the total thickness of the positive electrode is in the range of 110 to 360 μm, the thickness of the conductive layer on one surface of the negative electrode is in the range of 1 to 20 μm, the thickness of the negative electrode active material layer on one surface of the negative electrode is in the range of 5 to 100 μm, and the total thickness of the negative electrode is in the range of 40 to 210 μm.

14. An electric device having the organic electrolyte capacitor according to claim 1.

15. An electrical storage device including a positive electrode, a negative electrode, and an electrolyte capable of transferring lithium ions.

wherein the positive electrode contains a substance capable of carrying lithium ions and/or anions reversibly as a positive electrode active material, wherein the negative electrode contains a substance capable of carrying lithium ions reversibly as a negative electrode anions material, and wherein the positive and negative electrodes have conductive layers made of conductive materials on electrode current collectors having through-holes that penetrate the front and rear surfaces and at least part thereof is filled with the conductive materials, and have positive or negative electrode active material layer on the conductive layers.

16. An organic electrolyte capacitor including a positive electrode, a negative electrode and an electrolyte capable of transferring lithium ions, wherein the positive electrode contains a substance capable of carrying lithium ions and/or anions reversibly as a positive electrode active material, the negative electrode contains a substance capable of carrying lithium ions reversibly as a negative electrode active material, wherein the positive and negative electrodes include the positive or negative electrode active material layer on an electrode substrate that has a conductive layer made of a conductive material on an electrode current collector, which has a through-hole that penetrates the front and rear surfaces, and the negative electrode electrochemically carries lithium ions, and wherein the electrode substrate is a three-layer laminate including a first conductive layer that is made of a conductive material and has many through-holes on a surface of an imperforate metal foil and a second conductive layer that is made of a conductive material and has holes or no holes on the other surface of the imperforate metal foil, and has through-holes in the imperforate metal foil, which are formed by etching the laminate.

* * * * *